United States Patent
Collins et al.

[11] Patent Number: 6,060,556
[45] Date of Patent: May 9, 2000

[54] PROCESS FOR PREPARING REACTIVE LATEX BLENDS WHICH ARE CHEMICALLY AND PHYSICALLY STABLE UNTIL FILM FORMATION

[75] Inventors: Martha Jean Collins, Blountville, Tenn.; James Wayne Taylor, Gurnee, Ill.; David Logan Murray, Fall Branch, Tenn.

[73] Assignee: Eastman Chemical Company, Kingsport, Tenn.

[21] Appl. No.: 09/082,723

[22] Filed: May 21, 1998

Related U.S. Application Data

[60] Provisional application No. 60/047,324, May 21, 1997.

[51] Int. Cl.[7] ........................................... C08L 31/00
[52] U.S. Cl. ................. 524/533; 524/555; 525/153; 525/154; 525/293; 525/300; 525/303; 525/329.9; 528/176
[58] Field of Search .................. 528/176; 524/533, 524/555; 525/153, 154, 293, 300, 303, 329.9

[56] References Cited

U.S. PATENT DOCUMENTS

| | | | |
|---|---|---|---|
| 3,113,038 | 12/1963 | Lattarulo et al. | 117/140 |
| 3,261,797 | 7/1966 | McDowell et al. | 260/29.6 |
| 3,290,417 | 12/1966 | Christenson et al. | 260/901 |
| 3,325,443 | 6/1967 | Christenson et al. | 260/41 |
| 3,356,627 | 12/1967 | Scott | 260/29.6 |

(List continued on next page.)

FOREIGN PATENT DOCUMENTS

| | | |
|---|---|---|
| 358358 | 3/1990 | European Pat. Off. . |
| 390370 | 10/1990 | European Pat. Off. . |
| 483915 | 5/1992 | European Pat. Off. . |
| 483915 | 5/1993 | European Pat. Off. . |
| 0 552 469 A2 | 7/1993 | European Pat. Off. . |

(List continued on next page.)

OTHER PUBLICATIONS

Nishihata et al., "Formation and Hydrolysis of Enamine in Aqueous Solution" Chem. Pharm. Bull., Jan. 26, 1984.

Rector et al., "Applications for the Acetoacetyl Functionality in Thermoset Coatings" Feb. 3, 1988.

Lee et al., "Effects of Surfactants and Polymerization Methods On The Morphology of Particles Formed in 'Core–Shell' Emulsion Polymerization of Methyl Methacrylate and Styrene" Makromol. Chem., Sep. 8, 1989.

"For Your Unlimited Imagination: Polymin (Polyethylenimine)" 1992 BASF Corporation.

Moszner et al. "Reaction behaviour of monomeric β–ketoesters" Polymer Bulletin, 1994.

Keith M. Moody, "Waterborne Acrylic Emulsion Using AAEM" Technical Tips, Eastman Kodak Company Sep. 1, 1995.

*Primary Examiner*—Terressa M. Boykin
*Attorney, Agent, or Firm*—Rose M. Allen; Harry J. Gwinnell

[57] ABSTRACT

This invention provides the composition, preparation, and end-use of waterborne crosslinking technology based compositions prepared from water-based latexes. The invention provides a water-based latex comprising dispersed, waterborne amino-functional polymer particles; dispersed, waterborne pendant-functional polymer particles; and water. The waterborne pendant-functional polymer comprises at least one pendant amine reactive functional moiety selected from the group consisting of carbonate, epoxide, isocyanate, isopropenyl, carboxylic acid, and allyl groups. In a preferred embodiment, a latex of the invention comprises dispersed, waterborne polymeric (polyamino)enamine (PPAE) particles; dispersed, waterborne pendant-functional polymer particles; and water. The PPAE is the reaction product of a surfactant-stabilized acetoacetoxy-functional polymer (SAAP) and a poly(alkylenimine). The water-based latexes of the invention provide stable emulsions containing a blend of waterborne polymer particles which undergo crosslinking upon film formation. The latex films or coatings may be cured at ambient temperatures or may be thermally cured. The latex is useful in variety of coating compositions such as, for example, paints, inks, sealants, and adhesives.

24 Claims, 1 Drawing Sheet

U.S. PATENT DOCUMENTS

| | | | |
|---|---|---|---|
| 3,386,939 | 6/1968 | Mesee et al. | 260/29.3 |
| 3,483,149 | 12/1969 | Gresenz et al. | 260/18 |
| 3,553,116 | 1/1971 | Kaplan et al. | 260/17 |
| 3,607,834 | 9/1971 | Marx et al. | 260/63 R |
| 3,639,327 | 2/1972 | Drelich | 260/29.6 NR |
| 3,678,013 | 7/1972 | Sherwood et al. | 260/77.5 R |
| 3,679,564 | 7/1972 | Dowbenko et al. | 204/181 |
| 3,725,124 | 4/1973 | Gorton et al. | 117/138.8 UA |
| 3,927,206 | 12/1975 | Blank et al. | 424/81 |
| 4,136,067 | 1/1979 | Reed et al. | 521/32 |
| 4,158,725 | 6/1979 | Nishimura et al. | 526/52.1 |
| 4,210,565 | 7/1980 | Emmons et al. | 260/29.6 TA |
| 4,239,893 | 12/1980 | Pigerol et al. | 546/321 |
| 4,241,682 | 12/1980 | Kondstandt | 114/67 R |
| 4,244,850 | 1/1981 | Mylonakis | 260/29.6 M |
| 4,535,128 | 8/1985 | Umemoto et al. | 525/162 |
| 4,812,541 | 3/1989 | Mallya et al. | 526/264 |
| 4,820,863 | 4/1989 | Taylor | 560/115 |
| 4,855,349 | 8/1989 | Ingle | 524/432 |
| 4,906,684 | 3/1990 | Say | 524/548 |
| 4,908,229 | 3/1990 | Kissel | 427/54.1 |
| 4,908,403 | 3/1990 | Spada et al. | 524/818 |
| 4,987,186 | 1/1991 | Akiyama et al. | 525/107 |
| 5,002,998 | 3/1991 | Carey et al. | 524/555 |
| 5,021,469 | 6/1991 | Langerbeins et al. | 523/201 |
| 5,053,441 | 10/1991 | Biale | 523/201 |
| 5,055,506 | 10/1991 | Knutson | 524/100 |
| 5,073,445 | 12/1991 | Ingle | 428/314.4 |
| 5,100,969 | 3/1992 | Yamamoto et al. | 525/327.3 |
| 5,108,575 | 4/1992 | Chung et al. | 204/181.7 |
| 5,185,397 | 2/1993 | Biale | 524/820 |
| 5,202,375 | 4/1993 | Biale | 524/562 |
| 5,227,413 | 7/1993 | Mitra | 523/116 |
| 5,242,978 | 9/1993 | Muller et al. | 525/102 |
| 5,244,963 | 9/1993 | Biale | 524/555 |
| 5,246,984 | 9/1993 | Darwen et al. | 523/404 |
| 5,247,040 | 9/1993 | Amick et al. | 526/286 |
| 5,270,380 | 12/1993 | Adamson et al. | 524/556 |
| 5,277,978 | 1/1994 | Feustel et al. | 428/402 |
| 5,296,530 | 3/1994 | Bors et al. | 524/558 |
| 5,308,890 | 5/1994 | Snyder | 523/201 |
| 5,344,675 | 9/1994 | Snyder | 427/388.4 |
| 5,349,026 | 9/1994 | Emmons et al. | 525/328.6 |
| 5,362,816 | 11/1994 | Snyder et al. | 525/329.9 |
| 5,364,891 | 11/1994 | Pears et al. | 522/149 |
| 5,371,148 | 12/1994 | Taylor et al. | 525/293 |
| 5,391,624 | 2/1995 | Rasoul et al. | 525/216 |
| 5,414,041 | 5/1995 | Larson et al. | 524/589 |
| 5,426,129 | 6/1995 | Emmons et al. | 522/6 |
| 5,484,849 | 1/1996 | Bors et al. | 525/167.5 |
| 5,494,961 | 2/1996 | Lavoie et al. | 525/102 |
| 5,494,975 | 2/1996 | Lavoie et al. | 525/928.6 |
| 5,498,659 | 3/1996 | Esser | 524/549 |
| 5,525,662 | 6/1996 | Lavoie et al. | 524/558 |
| 5,534,310 | 7/1996 | Rokowski et al. | 427/494 |
| 5,548,024 | 8/1996 | Lavoie et al. | 525/102 |
| 5,559,192 | 9/1996 | Bors et al. | 525/300 |
| 5,562,953 | 10/1996 | Bors et al. | 427/558 |
| 5,605,722 | 2/1997 | Esser | 427/388.4 |
| 5,605,952 | 2/1997 | Esser | 524/522 |
| 5,605,953 | 2/1997 | Esser | 524/522 |
| 5,609,965 | 3/1997 | Esser | 428/522 |
| 5,616,764 | 4/1997 | Lavoie et al. | 556/482 |
| 5,672,379 | 9/1997 | Schall et al. | 427/137 |
| 5,763,546 | 6/1998 | Jung et al. | 525/313 |
| 5,767,199 | 6/1998 | Bors et al. | 525/153 |
| 5,783,626 | 7/1998 | Taylor et al. | 524/555 |

FOREIGN PATENT DOCUMENTS

| | | |
|---|---|---|
| 555774 | 8/1993 | European Pat. Off. . |
| 2535372 | 2/1977 | Germany . |
| 3713511 | 12/1987 | Germany . |
| 61-21171 | 1/1986 | Japan . |
| 1-229242 | 9/1989 | Japan . |
| 3-6236 | 1/1991 | Japan . |
| 4-189874 | 7/1992 | Japan . |
| WO 91/14715 | 10/1991 | WIPO . |
| WO 95/00573 | 1/1995 | WIPO . |
| WO 96/16998 | 6/1996 | WIPO . |
| WO 96/32424 A2 | 10/1996 | WIPO . | ns.

PROCESS FOR PREPARING REACTIVE LATEX BLENDS WHICH ARE CHEMICALLY AND PHYSICALLY STABLE UNTIL FILM FORMATION

This application claims benefit under 35 U.S.C. §119 of provisional application Ser. No. 60/047,324, filed May 21, 1997.

FIELD OF THE INVENTION

This invention belongs to the field of emulsion chemistry. In particular, it relates to a blend of different waterborne polymers which are useful in a variety of coating compositions.

BACKGROUND OF THE INVENTION

In an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in solvent-based compositions. While the move from organic solvent-based to aqueous compositions brings health and safety benefits, the aqueous coating compositions must meet or exceed the performance standards expected from solvent-based compositions. The need to meet or exceed such performance standards places a premium on the characteristics and properties of waterborne polymer compositions used in aqueous coating compositions.

Waterborne polymer having various functional groups have been used to impart and achieve desired properties to a particular coating composition. For example, a coating composition should exhibit good film formation, print and block resistance, as well as adhesion and tensile properties. Polymers having acetoacetoxy- and enamine-functional groups represent one example of waterborne polymers which have such properties, may carry different functional groups, and are useful in aqueous coating compositions.

U.S. Pat. No. 5,296,530 discloses a quick-curing coating prepared from a polymer having acetoacetyl groups, in which substantially all of the acetoacetyl groups have been converted to enamine functional groups. This conversion occurs, for example, by treatment with ammonia or a primary amine. Coatings so prepared cure more quickly under sunlight or ultraviolet light than coatings which contain the acetoacetyl functional polymer but which have not been converted to an enamine form.

U.S. Pat. Nos. 5,484,975 and 5,525,662 describe the preparation of polymers containing functional acetoacetate groups and then, following the polymerization, reacting the acetoacetate group with a functional amine to form an enamine. The resulting polymers are reported to have a variety of uses including coatings, sealants, adhesives, and saturant applications.

U.S. Pat. No. 5,498,659 discloses polymeric formulations comprising an aqueous carrier, at least one polymeric ingredient, a non-polymeric polyfunctional amine, and a base. The polymeric ingredient has both acid-functional and acetoacetoxy-type functional moieties. The aqueous polymeric formulations produce crosslinked polymeric surface coatings on a substrate.

Japanese Patent 61-21171 describes a fast-curing adhesive consisting of two separate liquids. The first liquid is an aqueous solution and/or aqueous emulsion of a polymer compound containing an acetoacetyl group. The second liquid consists of polyethylene imine.

Even with current waterborne polymer formulations, a need remains for improved aqueous coating compositions and waterborne polymers for use in those compositions. In particular, a need exists for waterborne polymer compositions which may formulated as a single, stable composition but which undergo crosslinking upon film formation imparting one or more desired properties to the resulting coating. The present invention meets such needs.

SUMMARY OF THE INVENTION

This invention provides a water-based latex comprising dispersed, waterborne amino-functional polymer particles; dispersed, waterborne pendant-functional polymer particles; and water. In a preferred embodiment, a latex of the invention comprises dispersed, waterborne polymeric (polyamino)enamine (PPAE) particles; dispersed, waterborne pendant-functional polymer particles; and water. The PPAE is the reaction product of a surfactant-stabilized acetoacetoxy-functional polymer (SAAP) and a poly (alkylenimine). The water-based latexes of the invention provide stable emulsions containing a blend of waterborne polymer particles which undergo crosslinking upon film formation. The latex films or coatings may be cured at ambient temperatures or may be thermally cured. The latex is useful in a variety of coating compositions such as, for example, paints, inks, sealants, and adhesives.

DETAILED DESCRIPTION OF THE INVENTION

Figure 1:
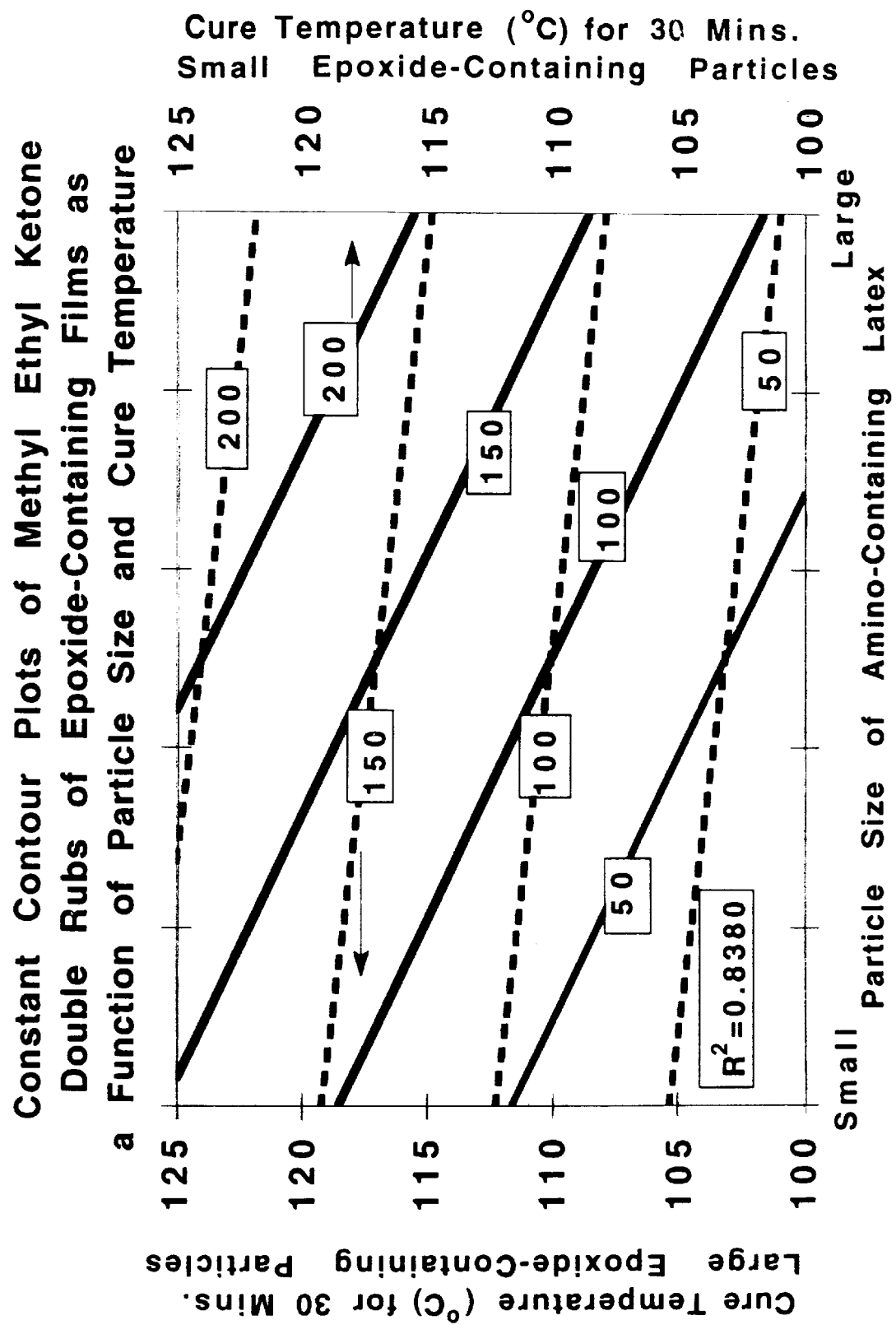
FIG. 1 depicts constant contour plots of methyl ethyl ketone double rubs as a function of size of epoxide-containing latexes, and PEI-containing latexes.

The present invention provides a water-based latex. In one embodiment, the latex affords a stable, emulsion containing a blend (or mixture) of dispersed, waterborne polymer particles which undergo crosslinking upon film formation. Latexes of the invention are stable when stored at temperatures at or moderately above room temperature. Yet, a film or coating formed from a latex of the invention may be cured at room temperature (ambient cure) or at elevated temperatures (thermal cure). A water-based latex comprises dispersed, waterborne amino-functional polymer particles; dispersed, waterborne pendant-functional polymer particles, and water. In other words, a water-based latex of the invention is an aqueous dispersion containing separate waterborne amino-functional polymer particles and separate waterborne pendant-functional polymer particles.

In the water-based latexes of the invention, the polymers generally exist as particles dispersed in water. The particles may be structured or unstructured. Structured particles include, but are not limited to, core/shell particles and gradient particles. The particle size of the polymers may range from about 25 to about 500 nm. Preferred particle sizes for small particles range from about 25 to about 100 nm, more preferably from about 45 to 80 nm. For large particles, preferred particles sizes range from about 110 to about 450 nm. The polymer particles generally have a spherical shape. In a preferred embodiment, the generally spherical polymeric particle has a core portion and a shell portion. The core/shell polymer particles may also be prepared in a multilobe form, a peanut-shaped form, an acorn form, or a raspberry form. It is further preferred in such particles that the core portion comprises about 20 to about 80 of the total weight of said particle and the shell portion comprises about 80 to about 20 of the total weight volume of the particle.

A preferred molecular weight of the polymer in accordance with the present invention, is a weight average molecular weight (Mw) of from 1,000 to 1,000,000 as determined by gel permeation chromatography (GPC). A more preferred range for the weight average molecular weight is from 5,000 to 250,000.

The glass transition temperature (Tg) of the polymer in accordance with the present invention, may be up to about 100° C. In a preferred embodiment of the present invention, where a film forming at ambient temperatures of the particles is desirable, the glass transition temperature may preferably be under 60° C.

The Amino-Functional Polymer

Polymers having amino (NH) groups available to react with the acetoacetoxy-functional polymer upon film formation may be used as an amino-functional polymer in a water-based latex of the invention. The amino groups may be primary or secondary amines. In general, the amino groups should be present at or near the surface of the polymer particle to react with the acetoacetoxy-functional polymer. The amino-functional polymer should contain a sufficient number of amino groups to permit efficient crosslinking with the acetoacetoxy-functional polymer. Exemplary amino-functional polymers include, but are not limited to, polymeric (polyamino)enamines and polymers prepared by reacting aziridines with carboxylic acid-containing latexes such as described in U.S. Pat. No. 3,261, 796.

Polymeric (polyamino)enamines represent a particularly preferred group of amino-functional polymers for use in a water-based latex according to the invention.

Reacting a surfactant-containing acetoacetoxy-functional polymer (SAAP) with ammonia, a primary or secondary amine yields a surfactant-containing enamine-functional polymer of the invention. A polymeric (polyamino)enamine (PPAE) results from the reaction of a SAAP with a poly (alkylenimine). Polymeric (polyamino)enamines represent a particularly preferred group of amino-functional polymers for use in a waterborne polymer composition according to the invention. These various polymers according to the invention, their preparation, and the related preferred embodiments are discussed below.

The SAAP may be prepared by free radical emulsion polymerization of a non-acid vinyl monomer having an acetoacetoxy functionality such as those of Formula (1) below with at least one non-self-polymerizing, surface-active vinyl monomer and other non-acid vinyl monomers. This affords water-based dispersion of surfactant-containing polymer particles with the polymer having pendant acetoacetoxy groups. As used here, a non-acid vinyl monomer is an ethylenically-unsaturated, non-carboxylic acid-containing monomer. A pendant acetoacetoxy group is not strictly limited to those at the termini of the polymer. Pendant acetoacetoxy groups also include groups attached to the polymer's backbone and available for further reaction.

The SAAP preferably contains about 1 to about 40 weight percent acetoacetoxy-functional monomers such as those of Formula (1) below, about 0.05 to about 20 weight percent of at least one non-self-polymerizing, surface-active vinyl monomer and about 60 to about 90 weight percent of other non-acid vinyl monomers. The weight percentage is based on the total amount of monomer. More preferably, the SAAP has about 10 to about 25 weight percent acetoacetoxy monomers, about 0.1 to about 10 weight percent of at least one non-self-polymerizing, surface-active vinyl monomer and about 75 to about 90 weight percent of other vinyl monomers.

The water-based emulsion polymerization to prepare the SAAP preferably occurs in the presence of a nonionic surfactant and an anionic surfactant. The nonionic surfactant may be present in amounts ranging from about 0.25 to about 5 phr, and the anionic surfactant in amounts ranging from about 0.1 to 1 phr. The unit "phr" defines the grams dry weight of the recited component, for example the surfactant, per 100 grams dry weight of the resin, where the "resin" includes all polymerization components excluding water. Aspects of this emulsion polymerization and preferred embodiments are discussed below.

Any non-acid vinyl monomer having acetoacetoxy-type functionality may be used to prepare a polymer of the invention. Of such monomers, preferred monomers are those of Formula (1):

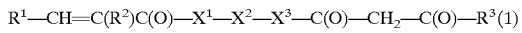

$$R^1-CH=C(R^2)C(O)-X^1-X^2-X^3-C(O)-CH_2-C(O)-R^3 (1)$$

For an acetoacetoxy-type monomer of Formula (1), $R^1$ is a hydrogen or halogen. $R^2$ is a hydrogen, halogen, $C_1$–$C_6$ alkylthio group, or $C_1$–$C_6$ alkyl group. $R^3$ is a $C_1$–$C_6$ alkyl group. $X^1$ and $X^3$ are independently O, S, or a group of the formula —N(R')—, where $R^1$ is a $C_1$–$C_6$ alkyl group. $X^2$ is a $C_2$–$C_{12}$ alkylene group or $C_3$–$C_{12}$ cycloalkylene group. The alkyl and alkylene groups described here and throughout the specification may be straight or branched groups. Preferred monomers of Formula (1) are acetoacetoxyethyl methacrylate, acetoacetoxyethyl acrylate, acetoacetoxy(methyl)ethyl acrylate, acetoacetoxypropyl acrylate, allyl acetoacetate, acetoacetamidoethyl (meth)acrylate, and acetoacetoxybutyl acrylate. Acetoacetoxyethyl methacrylate (AAEM) represents a particularly preferred monomer of Formula (1).

Suitable non-acid vinyl monomers which may be used, for example, include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; 2-ethylhexyl methacrylate; octyl acrylate; octyl methacrylate; iso-octyl acrylate; iso-octyl methacrylate; trimethylolpropyl triacrylate; styrene; α-methyl styrene; glycidyl methacrylate; carbodiimide methacrylate; $C_1$–$C_{18}$ alkyl crotonates; di-n-butyl maleate; di-octylmaleate; allyl methacrylate; di-allyl maleate; di-allylmalonate; methoxybutenyl methacrylate; isobornyl methacrylate; hydroxybutenyl methacrylate; hydroxyethyl (meth)acrylate; hydroxypropyl (meth) acrylate; acrylonitrile, vinyl chloride; ethylene; vinyl ethylene carbonate; epoxy butene; 3,4-dihydroxybutene; hydroxyethyl (meth)acrylate; methacrylamide; acrylamide; butyl acrylamide; ethyl acrylamide; vinyl (meth)acrylate; isopropenyl (meth)acrylate; cycloaliphaticepoxy (meth) acrylates; and ethylformamide. Such monomers are described in "The Brandon Worldwide Monomer Reference Guide and Sourcebook" Second Edition, 1992, Brandon Associates, Merrimack, New Hampshire; and in "Polymers and Monomers", the 1996–1997 Catalog from Polyscience, Inc., Warrington, Pa.

To increase polymer stability, a small amount (about 0.4 phr) of AMPS, sodium 2-acrylamido-2-methylpropane sulfonate, and other stabilizing monomers may be incorporated into the SAAP. Adding such stabilizing monomers to the polymer shell aids in preventing flocculation upon the addition of a polyalkylenimine to form a PPAE. High levels of such stabilizing monomers may create water membrane layers between polymer particles in the latex or disrupt film formation. AMPS is available from Lubrizol Corporation under the LUBRIZOL 2405 trade name.

Vinyl esters of the general Formula (2) represent further examples of non-acid vinyl monomers:

RCH=CH—O—C(O)—C(R)$_3$ (2)

In Formula (2), R is independently hydrogen or an alkyl group of up to 12 carbon atoms. Particular monomers of Formula (2) include $CH_2$=CH—O—C(O)—$CH_3$, $CH_2$=CH—O—C(O)—C($CH_3$)$_3$, $CH_2$=CH—O—C(O)—CH($C_2H_5$)($C_4H_9$), and $CH_2$=CH—O—C(O)—$CH_2CH_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

As a further preferred embodiment, the SAAP may also incorporate nitrogen-containing, non-acid vinyl monomers known to promote wet adhesion. Exemplary wet adhesion monomers include, for example, t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2-methacryloyloxy-ethyl)ethylene urea. N-($^2$-methacryloyloxyethyl)ethylene urea is available from RohmTech as 50% solution in water under the Rohamere 6852-O trade name and as a 25% solution in water under the Rohamere 6844 trade name. N-(2-methacrylamido-ethyl)ethylene urea is available from Rhone-Poulenc under the WAM trade name.

Small amounts of acid vinyl monomers may also be used to prepare an SAAP according to the invention. Such acid vinyl monomers include, for example, acrylic acid, methacrylic acid, itaconic acid, crotonic acid, and monovinyl adipate. Incorporating acid vinyl monomers into the SAAP may increase the viscosity of the resulting latex and may have a detrimental effect on the formation of an enamine-functional polymer according to the invention. Generally these monomers are used in small amounts. Preferably, the amount of acid vinyl monomers may range, for example, from 0 to 5 phr. Greater amounts may be used to achieve a desired effect, such as increased viscosity.

Preparation of the SAAP reacts non-acid vinyl monomers, such as described above, with at least one non-self-polymerizable, surface-active vinyl monomer (also known as a non-self-polymerizable ethylenically-unsaturated surfactant or a reactive surfactant). A non-self-polymerizable surfactant monomer, rather than polymerizing with itself to form a separate polymeric surfactant, is substantially (preferably completely) incorporated into the polymer of the invention. Thus, the surfactant becomes part of the polymer. Non-self-polymerizing surfactants possessing, for example, propenylphenyl or allyl groups are preferred. Examples include surface active monomers sold by PPG Industries, Inc., as MAZON® SAM 181, 183, 184, 211 surfactants which are anionic sulfates or sulfonates and MAZON® SAM 185–187 surfactants which are nonionic surfactants. Other non-self-polymerizing, surface-active vinyl monomers include the macro monomers sold by Daiichi Kogyo Seiyaku under the names NIOGEN RN, AQUARON or HITENOL surfactants. These include polyoxyethylene alkyl phenyl ether compounds of the general formulae (3), (4), and (5):

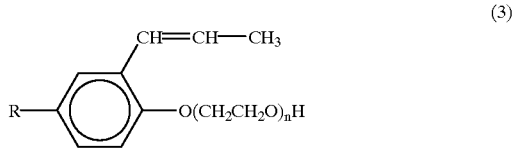

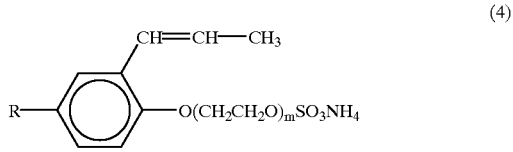

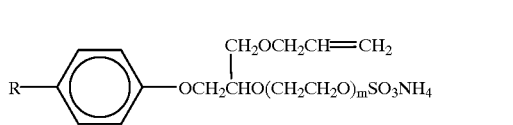

In Formulae (3), (4), and (5), R is nonyl or octyl and n and m are preferably integers of from 15 to 50 and 15 to 40, respectively. More preferably, n ranges from 20 to 40, and m from 15 to 25. HITENOL RN, HITENOL HS-20 and HITENOL A-10 products are particularly preferred non-self-polymerizing, surface-active monomers. Other such polymerizable surfactants include the sodium alkyl allyl sulfosuccinate sold by Henkel, under the trade name TREM LF-40 surfactant.

The SAAP (as well as other polymers useful in the invention) may be prepared using emulsion polymerization techniques known in the art. The polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, buffers, and catalysts, known in the art of emulsion polymerization, may be used to prepare the polymers.

Exemplary chain transfer agents are butyl mercaptan, dodecyl mercaptan, mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated here by reference. In particular, 2-ethylhexyl 3-mercaptopropionate represents a preferred chain transfer agent.

Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

As discussed above, the emulsion polymerization to prepare the SAAP preferably occurs in water and in the presence of a nonionic surfactant and/or an anionic surfactant. Suitable nonionic surfactants include surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, and triisopropyl phenol. Preferred nonionic surfactants are the TERGITOL 15-S-40 and TERGITOL NP-40 surfactants available from Union Carbide. TERGITOL 15-S-40 surfactant (CAS #68131-40-8) is a reaction product of a mixture of 11–15 carbon, linear secondary alcohols and ethylene oxide. TERGITOL NP-40 surfactant is the reaction product of a nonylphenol and about 40 moles of ethylene oxide. Another preferred nonionic surfactant is SURFYNOL 485 and SURFYNOL 485W surfactant available from Air Products.

Anionic surfactants which may be used in the invention include surfactants such as alkali metal or ammonium salts of alkyl, aryl or alkylaryl sulfonates, sulfates, phosphates, and the like. These anionic surfactants include, for example, sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like. AEROSOL 18 surfactant, a 35% solution of N-octyldecyl sulfosuccinimate in water and AEROSOL OT-75 surfactant, a 75% solution of sodium dioctyl sulfosuccinate in water and AEROSOL 501 surfactant, a 50% solution of disodium alkyl sulfosuccinate in water, from Cytec Industries are preferred anionic surfactants.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413. Cellulosics and polyvinyl alcohols may also be used.

To form a PPAE, a SAAP is reacted with a poly(alkylenimine). In general, a poly(alkylenimine) contains primary, secondary, and tertiary amine groups. Primary and secondary amine groups of the poly(alkylenimine) react with the pendant acetoacetoxy groups on the SAAP to form enamine linkages yielding a polymeric (polyamino)enamine or PPAE.

A poly(alkylenimine) for use in the invention may have a weight average molecular weight of about 800 to about 750,000. The poly(alkylenimine) is preferably a poly(ethylenimine) (PEI) and more preferably PEI having a weight average molecular weight of about 800 to about 25,000. The PEI may contain primary, secondary, and tertiary amine groups in a ratio of 1.5:1.4:1.0, respectively. Such PEI compounds are commercially available from many sources and include POLYMIN poly(ethylenimine) and LUPASOL™ poly(ethylenimine) available from BASF Corporation.

The reaction to form the PPAE may be accomplished by adding, with stirring, the appropriate poly(alkylenimine) to an emulsion of the SAAP. Sufficient poly(alkylenimine) should be used to achieve a molar ratio of NH groups to acetoacetoxy groups of about 1 to about 8 and preferably a molar ratio from about 2 to about 5. The amount of poly(alkylenimine) added to the polymer having pendant acetoacetoxy groups may range from about 5 phr (grams dry weight poly(alkylenimine) to 100 grams dry weight resin) to about 30 phr and preferably from about 8 phr to about 25 phr. Water-based emulsions of the polymers may be combined over about 15–30 minutes at ambient temperature. When preparing the PPAE in a direct process, the reaction mixture containing the polymer having pendant acetoacetoxy groups may need to be cooled before adding the poly(alkylenimine).

The Pendant-Functional Polymer

The pendant-functional polymer for use in the latex blends of the invention include polymers with at least one pendant amine reactive functional moiety. The pendant amine reactive functional moiety may be a carbonate group, an epoxide group, an isocyanate group, an isopropenyl group, a carboxylic acid group, or an allyl group. The pendant amine reactive functional moiety should be at or near the surface of the polymer particle. By having the pendant amine reactive functionality moiety at or near the surface of the particle, crosslinking upon film formation with the amino-functional polymer can be achieved. The pendant amine reactive functional moiety may be located at the termini of polymer as well as along the polymer backbone.

The pendant-functional polymer can be a homopolymer of a monomer containing at least one pendant amine reactive functional moiety, such as a carbonate group, an epoxide group, an isocyanate group, an isopropenyl group, an allyl group, a carboxylic acid group, or other amine reactive groups. The pendant-functional polymer may also contain a mixture of pendant-functional monomers. Preferably, the pendant-functional polymer is a copolymer of pendant-functional monomers and other vinyl co-monomers such as, but not limited to, the non-acid vinyl monomers discussed above. For example, the non-acetoacetoxy functionalized vinyl co-monomers include ethylenically unsaturated compounds such as substituted and unsubsituted acrylates, vinyl esters, styrenic derivatives and the like. Exemplary listings of such vinyl co-monomers may be found in U.S. Pat. Nos. 5,539,073 and 5,371,148 which are incorporated here by reference.

In general, the pendant-functional polymers are prepared by conventional suspension or emulsion free-radical initiated polymerization techniques. The polymerization can be initiated by a water-soluble or water-dispersible free-radical initiator, optionally in combination with a reducing agent, at an appropriate temperature, usually between 55 and 90° C. The polymerization of the monomers may be conducted batch wise, semi-batch or in a continuous mode. The emulsion polymerization techniques described above and shown in the examples, are preferably used to prepare the pendant-functional polymer.

Pendant-functional monomers containing a carbonate hydrolyzable moiety in accordance with the invention include those of the general formula (6):

$$R^4CH=CH-O-C(O)-C(R^4)_3 \qquad (6)$$

wherein $R^4$ is independently hydrogen or $C_1$–$C_{12}$ alkyl group. Particular monomers of formula (6) include: $CH_2=CH-O-C(O)-C(CH_3)_3$, $CH_2=CH-O-C(O)-CH(C_2H_5)(C_4H_9)$, $CH_2=CH-O-C(O)-CH_3$ and $CH_2=CH-O-C(O)-CH_2CH_3$.

Upon copolymerization, the carbonate functional monomer is present from 2 to 24 wt % based on the total amount of monomer. Preferably, the carbonate functional monomer is present from 6 to 12 wt %, based on the total amount of monomers.

Another preferred pendant hydrolyzable functional moiety in accordance with the invention is an epoxide moiety. Suitable pendant amine reactive functional monomers containing an epoxide hydrolyzable moiety in accordance with the present invention include those of general formula (7):

$$R^5-R^6-R^7-R^8 \quad (7)$$

where $R^5$ is selected from

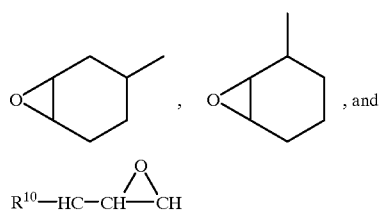

where $R^{10}$ is hydrogen or a $C_1-C_3$ alkyl group; $R^6$ is selected from —C(=O)—O— or —O—C(=O)— group; $R^7$ is selected from —(—CH$_2$CH$_2$—O)$_n$—CH$_2$CH$_2$—O—C(=O)— or a $C_1-C_6$ alkyl group, wherein is an integer of 0 to 100; $R^8$ is —CHR$^9$=CHR$^9$, where $R^9$ are the same or different and are selected from hydrogen or methyl group. $R^8$ may be directly connected to $R^5$, or $R^8$—$R^7$— may be directly connected to $R^5$, or $R^1$ may be connected to $R^5$—$R^6$— group. By way of example, monomers of formula (7) include glycidyl (meth)acrylate, allyl glycidyl ether,

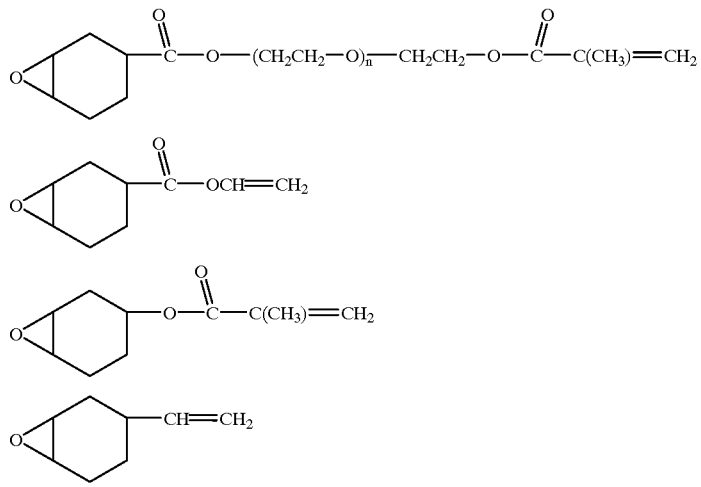

The weight percent of an epoxide functional monomer in a copolymer may range from 2 to 24 wt % based on the total amount of monomers, preferably from 6 to 12 wt %.

Another pendant hydrolyzable functional moiety in accordance with the present invention is an isocyanate group. Suitable monomers containing an isocyanate hydrolyzable moiety in accordance with the present invention include those of general formula (8):

$$R^{11}H=C(R^{11})-R^{12}-(CR^{13})_2-NCO \quad (8)$$

where $R^{11}$ is a hydrogen or a methyl group; $R^{12}$ is a $C_1-C_{20}$ alkyl group, a $C_3-C_8$ cycloalkyl group, an aryl group, a —C(=O)—O— group, or a —C(=O)—O—R$^{14}$— group, where $R^{14}$ is a $C_1-C_{20}$ alkyl group; and $R^{13}$ is independently hydrogen or a $C_1-C_3$ alkyl group. "Aryl" is defined as a phenyl, naphthyl, or anthracenyl group, in which each hydrogen atom may be replaced with a $C_1-C_{10}$ alkyl group, preferably with a $C_1-C_6$ alkyl group, and even more preferably with a methyl group. Accordingly, a phenyl group may be substituted from 1 to 4 times and naphthyl may be substituted from 1 to 6 times. When $R^{12}$ is phenyl, the $R^{11}$CH=C(R$^{11}$)— and the —(CR$^{13}$)$_2$-NCO groups of formula (8) may be in the ortho, meta or para positions. "Alkyl" in this context refers to a straight chain or branched alkyl group. A "cycloalkyl" group may be $C_1-C_{10}$ alkyl substituted. A preferred monomer containing an isocyanate moiety is m-isopropenyl-α,α-dimethylbenzyl isocyanate.

Pendant-functional monomers containing a carboxylic acid group include, but are not limited to acrylic acid, methacrylic acid, itaconic acid, crotonic acid, and monovinyl adipate.

Water-Based Latexes of the Invention

In a water-based latex of the invention, the amino-functional polymer particles, (preferably PPAE particles) may be present from about 5 to about 50 weight percent based on dry resin and more preferably from about 10 to about 25 weight percent. The pendant-functional polymer may be present from about 50 to about 95 weight percent based on dry resin. The pendant-functional polymer is, more preferably, present from about 75 to about 90 weight percent based on dry resin.

The examples below illustrate the preparation of a water-based latex according to the invention. In general, the latex of the invention may be prepared by mixing aqueous latexes of the amino-functional polymer particles and of the pendant-functional polymer particles. Accordingly, a water-based latex of the invention may be a "one pack" pre-mixed latex or a "two pack" for mixing prior to use. Due to the advantageous stability of a water-based latex of the invention containing the amino-functional polymer particles and of the pendant-functional polymer particles, "one pack" latexes are preferred. The surfactants discussed above are preferably components of those latexes, providing stability prior to and after mixing. A latex of the invention may also contain other additives known in latex compositions and may use other emulsion polymerization or blending methodology such as disclosed in U.S. Pat. No. 5,371,148, incorporated here by reference.

A preferred embodiment of the invention relates to a latex containing dispersed, waterborne amino-functional polymer particles, (preferably PPAE particles); dispersed, waterborne pendant-functional polymer particles; and a buffer, particularly an ammonium-based buffer. The pH of a water-based latex of the invention may be adjusted and/or buffered using, for example, sodium bicarbonate, ammonium bicarbonate, ammonium dihydrogenphosphate, an ammonium salt of a polyacrylate, or a mixture of such buffers. The buffering compound, such as ammonium bicarbonate, may be added to an aqueous dispersion of either amino-functional polymer particles or pendant-functional polymer particles prior to mixing or to the final latex. Preferably the buffer is added to the final blended latex.

When an ammonium buffer is used, an equilibrium exits between the ammonium ion and amine groups on the amino-functional polymer particles. Latexes having pH values in the range of about 7.0 to 9.2, preferably 8.4 to 9.2, may be achieved using ammonium buffers. Moreover, the buffered latexes of the invention possess increased stability (shelf life) at elevated temperatures and for long periods of time.

The water-based latexes of the invention are useful in a variety of coating compositions such as architectural coatings, maintenance coatings, industrial coatings, automotive coatings, textile coatings, inks, adhesives, and coatings for paper, wood, and plastics. Accordingly, the present invention relates to such coating composition containing a water-based latex of the invention. The latexes of the invention may be incorporated in those coating compositions in the same manner as known polymer latexes and used with the conventional components and or additives of such compositions. The coating compositions may be clear or pigmented. With their crosslinking ability, adhesion properties, and resistance properties, the water-based latexes of the invention impart new and/or improved properties to the various coating compositions.

Upon formulation, a coating composition containing a water-based latex of the invention may then be applied to a variety of surfaces, substrates, or articles, e.g., paper, plastic, steel, aluminum, wood, gypsum board, or galvanized sheeting (either primed or unprimed). The type of surface, substrate, or article to be coated generally determines the type of coating composition used. The coating composition may applied using means known in the art. For example, a coating composition may be applied by spraying or by coating a substrate. In general, the coating may be dried by heating but preferably is allowed to air dry. Advantageously, a coating employing a water-based latex of the invention may be thermally or ambiently cured. As a further aspect, the present invention relates to a shaped or formed article which has been coated with a coating compositions of the present invention.

A coating composition according to the invention may comprise a water-based latex of the invention, water, a solvent, a pigment (organic or inorganic) and/or other additives and fillers known in the art. When a solvent is used, water-miscible solvents are preferred.

For example, a latex paint composition of the invention may comprise a water-based latex of the invention, a pigment and one or more additives or fillers used in latex paints. Such additives or fillers include, but are not limited to, leveling, rheology, and flow control agents such as silicones, fluorocarbons, urethanes, or cellulosics; extenders; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; curing agents; or coalescing agents. Specific examples of such additives can be found in *Raw Materials Index,* published by the National Paint & Coatings Association, 1500 Rhode Island Avenue, N.W., Washington, D.C. 20005.

A water-based latex of the present invention can be utilized alone or in conjunction with other conventional waterborne polymers. Such polymers include, but are not limited to, water dispersible polymers such as consisting of polyesters, polyester-amides, cellulose esters, alkyds, polyurethanes, epoxy resins, polyamides, acrylics, vinyl polymers, vinyl acrylic polymers, styrene-butadiene polymers, vinylacetate-ethylene copolymers, and the like.

Used in combination with certain other water-dispersible polymers, the water-based latexes of the invention bring a unique advantage to the final composition, in addition to their crosslinking ability, adhesion properties, and resistance properties. The PPAE, when present as a preferred amino-functional polymer, has the ability to scavenge residual $\alpha,\beta$-unsaturated, carbonyl- or electron withdrawing group-containing monomer remaining in the polymer latex. In other words, the PPAE scavenges, through a Michael-addition reaction, residual monomers such as $\alpha,\beta$-unsaturated acids, $\alpha,\beta$-unsaturated esters, $\alpha,\beta$-unsaturated amides, and $\alpha,\beta$-unsaturated nitriles. Removing these monomers can, not only eliminate the odors associated with them, but also improve health and safety when using the composition.

The following examples are intended to illustrate, not limit, the invention. The examples of various coating compositions of the invention use the following materials:

DOWICIL 75 is a preservative sold by DOW Chemical Company, Midland, Mich.

LUPASOL G35 poly(ethylenimine), MW 2000, sold by BASF as a 50% solution in water.

TAMOL 1124 and ACRYSOL SCT-275 are dispersants sold by Rohm & Haas Company.

SCT 275 rheology modifier (thickener) sold by Rohm & Haas & Company.

FOAMASTER AP and FOAMASTER VF defoamers sold by Henkel.

TI-PURE R-900 titanium dioxide pigment sold by DuPont.

TRITON CF-10 surfactant sold by Union Carbide.

CELLOSIZE 4400H rheology modifier sold by Union Carbide.

FC-430 Fluoro surfactant, (98.5% solids), sold by 3M, St. Paul, Minn.

SURFYNOL 104, 104DPM, and 485W products (50% Solids), sold by Air Products and Chemicals, Inc., Allentown, Pa.

TEXANOL is an ester alcohol solvent produced by Eastman Chemical Company, Kinsport, Tenn.

t-butylhydroperoxide was used as a 70% solution in water.

The following methods were used to evaluate the coatings and films prepared according to the invention.

Latex Gel Fraction/Swell Ratio:

Latex gel fraction (LGF) is obtained by determining the insoluble weight fraction of polymer in a latex sample. Latex swell ratio (LSR) is obtained by determining the ratio of the insoluble polymer weight fraction swollen in the selected solvent (by weight) to dry weight of the insoluble weight fraction in a latex sample. Average values are determined from triplicate or quadruplicate measurements with acetone as the solvent.

The procedure used is as follows. For each sample determination, a centrifuge tube is baked in a vacuum oven at 120° C. for 90 minutes, cooled in a desiccator of $P_2O_5$ and weighed (W1). Enough latex is added to the conditioned tube to make approximately a 1% solution when solvent is added and the latex weight is recorded (W2). Solvent is added to the tube until the tube is approximately three fourths full and the solution is allowed to sit overnight. The next day, the sample is centrifuged at 75,530 rpm for 30 minutes. The clear liquid portion in the tube is removed. The remaining polymer gel is washed with additional solvent. The centrifuge and washing step is repeated twice more. Finally, the clear liquid portion is removed and the tube containing the wet gel is weighed (W3). The tube containing the wet gel is baked overnight in a forced air oven at 80° C. and then baked in a vacuum oven at 120° C. for 3 hours and cooled in a desiccator over $P_2O_5$. The tube plus dry solids is weighed and the vacuum portion of the baking procedure is repeated until reproducible weights are obtained (W4). Calculations were made according to the following equations:

$$LGF=(W4-W1)/(W2*TS)$$

$$LSR=(W3-W1)/(W4-W1)$$

where TS=total weight fraction solids of the latex.

Constant Temperature and Humidity Room:

Films were prepared and film measurements were conducted in a constant temperature and humidity (CTH) room at ASTM standard conditions for laboratory testing of 73.5±3.5° F. (23±2° C.) and 50±5% relative humidity.

Resistant Minimum Film Forming Temperature:

Resistant minimum film forming temperature (MFFT resist) is determined by casting a wet latex film with a 4-mil applicator cube on an MFFT bar set at a temperature range in which the film will coalesce during drying, pulling the edge of a brass spatula blade through the film from cold to hot end on the MFFT bar after 30 minutes, and recording the temperature at which the blade offers significant resistance to the experimenter.

Tensile:

Tensile tests are performed in the CTH room on a on a United Tensile Tester Model STM-1-PC, which is a constant rate of elongation machine. Film samples are obtained by casting the sample on release paper with a 7 mil bird bar, drying the film for the desired time at the stated conditions, and cutting a dogbone-shaped thin-film sample with a 1" wide die. The film is measured for film thickness, mounted in the tensile tester grips and tested at a crosshead speed of 1"/minute using a 5 lb-force load cell. Ten samples are run and the five samples with the greater breaking stress are averaged for all tensile values reported according to ASTM D2370.

Film Gel Fraction (FGF) and Film Swell Ratio (FSR):

Film gel fraction (FGF) is obtained by determining the insoluble weight fraction of polymer in a dry film sample. Film swell ratio (FSR) is obtained by determining the ratio of ratio of the insoluble polymer weight fraction swollen in the selected solvent (by weight) to dry weight of the insoluble weight fraction in a dry film sample. Average values are determined from quadruplicate measurements with acetone as the solvent.

The procedure used was as follows: for each sample determination, a 4"×4" 325-mesh steel screen and a metal weighing boat are baked in a vacuum oven at 120° C. for 90 minutes, cooled 30 minutes over $P_2O_5$ and weighed (W1 and W2, respectively). After the latex film is dried the required number of days under constant temperature and humidity or baked in the oven at the specified time and temperature, a piece of the film is cut, weighed (W3), placed in the aluminum pan, and put aside. Another film sample is cut, weighed (W4), and placed in a screw cap jar with excess solvent on a shaker bath for 16 hours at constant temperature. The film gel is recovered by pouring the solution plus wet solids from the jar through the screen and then weighing the screen plus retained wet solids (W5). At this point, the screen plus solids and the film sample in the aluminum boat are dried in a forced air oven at 80° C. overnight and then in a vacuum oven at 120° C. for 3 hours and cooled for 30 minutes in a desiccator over $P_2O_5$. The samples are weighed and the vacuum portion of the baking procedure is repeated until reproducible weights are obtained for the screen plus dry solids (W6) and the film sample in the aluminum boat (W7). Calculations were made by the equations shown below:

$$FGF=(W6-W1)/[(W4)*[(W7-W2)/W3]]$$

$$FSR=(W5-W1)/(W6-W1)$$

Yellowness Index:

Seven mil wet emulsion films are cast on polyester sheets. The coated polyester sheet and an uncoated control polyester sheet are allowed to dry under the specified conditions. Yellowness index is measured of both the clear emulsion film and the control panel placed on top of a white control panel using a calorimeter in the L,a,b mode.

Color:

Seven mil wet emulsion films are cast on polyester sheets. The coated polyester sheet and an uncoated control polyester sheet are allowed to dry under the specified conditions. Color is measured of both the clear emulsion film and the control panel placed on top of a white control panel using a colorimeter in the L,a,b mode.

Methyl Ethyl Ketone Resistance:

Films dried at specified conditions were constantly soaked with methyl ethyl ketone (MEK). Data was obtained using a crockmeter with a 1 kg weight placed on the arm for a total weight of approximately 1500 g. The test ended when the breakthrough of the film on the panel was first observed. Data were reported as MEK double rubs (one set of back and forth). All data are an average of three results.

Paint Viscosity:

Paint viscosity (in Krebs Units) was measured after 24 hours using a Krebs-Stormer viscometer.

Gloss:

Gloss was measured on 6 mil (wet) thick films cast on Leneta 2B opacity paper after 24 hours using a micro-tri-glossmeter at 20 degree and 60 degree settings by BYK-Gardner according to ASTM method D 523 Test Method for Specular Gloss.

Blocking Resistance:

Blocking resistance was determined using 6 mil (wet) films on Leneta 2B opacity paper according to ASTM 4946 Test Method for Blocking Resistance of Architectural Paints using 1 psi pressure after film dried to designated times. Heated block resistance was determined in a forced air oven at 120° F. with the painted surfaces face-to-face under 1 psi pressure for 30 minutes. The tests were numerically rated where a rating of 1 represents 100% pass where painted surfaces lift apart with no noise, a rating of 2 represents noise when painted surfaces are separated but no film degradation occurs, a rating of 3 represents some destruction of the painted surfaces when the two surfaces are separated and a rating of 4 represents 100% fail where the painted surfaces flow completely together and complete destruction of the films occurs upon separation.

Print Resistance:

Print resistance was determined using 6 mil (wet) films on Leneta 2B opacity paper according to ASTM D 2064-91 Test Method for Print Resistance of Architectural Paints using a 4 psi pressure placed on top of a #6 black rubber stopper which was placed on four layers of cheesecloth after film dried to designated times. Heated print resistance was determined in a forced air oven at 120° F. with folded cheesecloth (as above) under 4 psi pressure for 30 minutes. The tests were numerically rated where a rating of 1 represents 100% pass with no demarcation (cloth lifts off with no print left behind), a rating of 2 represents demarcations (some impression is observed), a rating of 3 represents 100% fail (the cheesecloth impregnates the film).

Scrub Resistance:

Scrub resistance was determined following ASTM D2486 Test Method for scrub resistance of architectural coatings. The coating is applied at 7 mil wet on Scrub Test Charts Form P121-10N and allowed to dry for the specified period of time. The panel is placed in a Gardco Scrub Machine, Model D-10V, 10 g of Standardized Scrub Medium (abrasive type) for ASTM D2486 and D3450 is placed on the scrub brush, the panel is wet with 5 ml DI water, the test machine counter is zeroed, and the test is run at the maximum test speed on the machine. After each 400 cycles before failure, the brush is removed and 10 more g of scrub medium is added evenly on the bristles, the brush is replaced, 5 ml of DI water is placed on the panel and the test is continued. The test is stopped at 1000 cycles or failure, whichever comes first. Failure is defined as the number of cycles to remove the paint film fully in on continuous line across the width of the shim.

Wet Adhesion Test:

This procedure tests the coatings adhesion to an aged, alkyd substrate under wet, scrubbing conditions. This procedure is described in "VYNATE™ (Union Carbide Chemicals and Plastics Corporation)—Vinyl Emulsion Vehicles for Semigloss Interior Architectural Coatings", M. J. Collins, et al., presented at the 19th Annual "Water-Borne High-Solids and Powder Coating Symposium", Feb. 26–28, 1992, New Orleans, La., USA.

A ten-mil drawdown of a commercial gloss alkyd paint is made on a "Leneta" scrub panel (adhesion varies from alkyd to alkyd—a Glidden Industrial Enamel was used.) The alkyd film is allowed to age one week at ambient conditions, then baked at 110° F. for 24 hours, and then aged at least one more week at ambient conditions. A seven-mil drawdown of the test paint is then made over the aged alkyd and allowed to air dry three days. (In order to differentiate between samples that pass this test, dry times may be shortened. Seven days is a common period, and occasionally 5 hours dry time is used. Constant temperature/humidity conditions, 72° F./50%, are normally used for drying.) The test paint is then cross-hatched with a razor and submerged in water for 30 minutes. The paint film is inspected for blistering and scratched with the fingernail to gauge the adhesion. While still wet, the panel is placed on a "Gardner" scrub machine. Ten ml of five percent "LAVAT™" soap slurry are added, and the Nylon scrub brush (WG 2000NB) is passed over the scored paint film area. Water is added as needed to keep the paint film wet (flooded). The number of brushing cycles for initial peel is noted and referred to as "break through." The number of cycles for complete removal of the film is often noted also and is referred to as "total failure."

Low Temperature Coalescence and Mudcracking:

Low temperature coalescence (LTC) was determined using one 7 mil (wet) paint film on Leneta 2B opacity paper which was allowed to dry for 24 hours in a room kept at 40° F. and 50% relative humidity and another 7 mil (wet) paint film on Leneta 2B opacity paper which was allowed to dry for 24 hours in a room kept at 70° F. and 50% relative humidity. The yellowness index (YI) was determined on each dry coating using a colorimeter in the L,a,b mode before and after staining the paint for 5 minutes with a 7 mil (wet) of K-and-N Special Test Compound. The test compound was removed by washing with a camel hair brush wetted with mineral spirits. The panel was hung vertically to air dry for at least 3 hours. The change in YI (delta YI) for each paint sample was calculated and low temperature coalescence was assigned a value based on the difference between the change in YI for the 70° F. and the 40° F. coating. Mudcracking was labeled "Yes" if the coating which was dried at 40° F. and 50% relative humidity developed cracks and the delta YI for the sample could not be determined.

Having generally described this invention, a further understanding can be obtained by reference to certain specific examples which are provided herein for purpose of illustration only and are not intended to be limiting unless otherwise specified.

EXAMPLE 1

Preparation of Large Core/Shell Epoxide-Containing Waterborne Particles

To a 3000 mL resin kettle equipped with a condenser, nitrogen purge, and subsurface feed tube were added 640 g of water, 4.05 g of TREM LF-40, 1.93 g of TERGITOL NP-40 (70%), 7.3 g of sodium carbonate, 44.24 g of methyl methacrylate, 8.26 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 271.78 g of methyl methacrylate, 128.12 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 171 g of water, 12.79 g of AEROSOL 18, 5.09 g of TERGITOL NP-40 (70%), 180.88 g of styrene, 90.0 g of 2-ethylhexyl acrylate, 143.92 g of glycidyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The latex was then filtered through 100 mesh wire screen. Solids level, 46.6; pH, 8.4; amount of dried material (100 mesh screen), 10.31 g; particle size (Dw), 239 nm, ZETA potential, −48 mv.

EXAMPLE 2

Preparation of Large Core/Shell Poly(ethylenimine)-Containing Waterborne Particles (Mole Ratio of N—H Group to Acetoacetoxy Group was 5.2)

To a 3000 mL resin kettle equipped with a condenser, nitrogen purge, and subsurface feed tube were added 640 g of water, 4.05 g of TREM LF-40, 1.93 g of TERGITOL NP-40 (70%), 7.3 g of sodium carbonate, 39.20 g of methyl methacrylate, 13.29 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C, an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 240.83 g of methyl methacrylate, 81.66 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 171 g of water, 12.79 g of AEROSOL 18, 5.09 g of TERGITOL NP-40 (70%), 144.90 g of styrene, 90.0 g of 2-ethylhexyl acrylate, 179.99 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. After cooling, 373.63 g of poly(ethylenimine) (50% in water) was added in place of the ammonium hydroxide solution. Mole ratio of N—H group to acetoacetoxy group was 5.2. The latex was then filtered through 100 mesh wire screen. Solids level, 46.9; pH, 10; amount of dried material (100 mesh screen), 3.11 g; particle size (Dw), 164 nm, ZETA potential, −23.9 mv (pH=11.7). Infrared analysis of clear films cast over ZnSe showed an absorption at 1653 $cm^{-1}$ and 1565 $cm^{-1}$ and a disappearance of the absorbencies at 1631 $cm^{-1}$ and 1655 $cm^{-1}$ after addition of the poly(ethylenimine). After reacting the poly(ethylenimine) with the pendant acetoacetoxy group, the latex was centrifuged and the water phased analyzed. Elemental analysis of the water phase showed that more than 98% of the poly(ethylenimine) was attached to the surface of the latex particles.

EXAMPLE 3
Preparation of Large Core/Shell Poly(ethylenimine)-Containing Waterborne Particles (Mole Ratio of N—H Group to Acetoacetoxy Group was 6.1)

The procedure for the preparation of the latex in Example 2 was similar to the latex preparation described in Example 1 except that 499.76 g of poly(ethylenimine) (50% in water) was added in place of the ammonium hydroxide solution. Mole ratio of N—H group to acetoacetoxy group was 6.1. The latex was then filtered -through 100 mesh wire screen. Solids level, 47.2; pH, 10; amount of dried material (100 mesh screen), 5.32 g; particle size (Dw), 197 nm, ZETA potential, −24.5 mv (pH=11.7). Infrared analysis of clear films cast over ZnSe showed an absorption at 1653 $cm^{-1}$ and 1565 $cm^{-1}$ and a disappearance of the absorbencies at 1631 $cm^{-1}$ and 1655 $cm^{-1}$ after addition of the poly (ethylenimine). After reacting the poly(ethylenimine) with the pendant acetoacetoxy group, the latex was centrifuged and the water phased analyzed. Elemental analysis of the water phase showed that more than 98% of the poly (ethylenimine) was attached to the surface of the latex particles.

EXAMPLE 4
Preparation of Small Core/Shell Epoxide-Containing Waterborne Particles To a 3000 mL resin kettle equipped with a condenser, nitrogen purge, and subsurface feed tube were added 1100 g of water, 49.0 g of HITENOL HS-20, 8.05 g of TERGITOL NP-40 (70%), 7.3 g of sodium carbonate, 44.24 g of methyl methacrylate, 20.85 g of styrene, 44.47 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 273.5 g of water, 19.65 g of AEROSOL 18, 20.19 g of TERGITOL NP-40 (70%), 271.78 g of methyl methacrylate, 128.12 g of styrene, 273.23 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 147 g of water, 12.15 g of AEROSOL 18, 12.5 g of TERGITOL NP-40 (70%), 90.88 g of styrene, 180 g of 2-ethylhexyl acrylate, 143.92g of acetoacetoxyethyl methacrylate, and 1.68g of the sodium $^2$-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The latex was then filtered through 100 mesh wire screen. Solids level, 42.3; amount of dried material (100 mesh screen), 3.2 g; particle size (Dw), 67 nm; ZETA potential, −46.3 mv (pH=8.4).

EXAMPLE 5
Preparation of Small Core/Shell Poly(ethylenimine)-Containing Waterborne Particles (Mole Ratio of N—H Group to Acetoacetoxy Group was 5.43)

To a 3000 mL resin kettle equipped with a condenser, nitrogen purge, and subsurface feed tube were added 1100 g of water, 49.0 g of HITENOL HS-20, 8.05 g of TERGITOL NP-40 (70%), 7.3 g of sodium carbonate, 39.20 g of methyl methacrylate, 13.29 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 273.5 g of water, 19.65 g of AEROSOL 18, 20.19 g of TERGITOL NP-40 (70%), 240.83 g of methyl methacrylate, 81.66 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 147 g of water, 12.15 g of AEROSOL 18, 12.5 g of TERGITOL NP-40 (70%), 144.90 g of styrene, 90.0 g of2-ethylhexyl acrylate, 179.99 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and then 376.7 g of poly(ethylenimine) (50% in water) was added in place of the ammonium hydroxide solution. Mole ratio of N—H group to acetoacetoxy group was 5.2. The latex was then filtered through 100 mesh wire screen. Solids level, 41.8; pH, 10; amount of dried material (100 mesh screen), 2.65 g; particle size (Dw), 66 nm; ZETA potential, −31.1 mv (pH=1 1). Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly (ethylenimine). After reacting the poly(ethylenimine) with the pendant acetoacetoxy group, the latex was centrifuged and the water phased analyzed. Elemental analysis of the water phase showed that more than 98% of the poly (ethylenimine) was attached to the surface of the latex particles.

EXAMPLE 6
Preparation of Small Core/Shell Poly(ethylenimine)-Containing Waterborne Particles (Mole Ratio of N—H Group to Acetoacetoxy Group was 4.27)

The procedure for the preparation of the latex in Example 6 was similar to the latex preparation described in Example 5 except that 506.33 g of poly(ethylenimine) (50% in water) was added in place of the ammonium hydroxide solution. Mole ratio of N—H group to acetoacetoxy group was 6.2. The latex was then filtered through 100 mesh wire screen. Solids level, 42.0; pH, 10; amount of dried material (100 mesh screen), 2.75 g; particle size (Dw), 71 nm; ZETA potential, −35.6 mv (pH=1 1). Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly (ethylenimine). After reacting the poly(ethylenimine) with the pendant acetoacetoxy group, the latex was centrifuged and the water phased analyzed. Elemental analysis of the water phase showed that more than 98% of the poly (ethylenimine) was attached to the surface of the latex particles.

EXAMPLE 7
Preparation of Unstructured Epoxide-Containing Waterborne Particles To a 1000 mL resin kettle equipped with a condenser, nitrogen purge, and subsurface feed tube were added 293.6 g of water, 1.34 g of TREM LF-40, 1.79 g of TERGITOL NP-40 (70%), 7.3 g of sodium carbonate, 12.71 g of styrene, 4.3 g of isooctyl acrylate, and 0.252 g of trimethylolpropane triacrylate. A nitrogen purge was begun, then the contents of the reactor brought up to 80° C. at 400 rpm. After reaching 80° C., an initiator charge composed of 2.3 g of sodium persulfate dissolved in 13 g of water was added to the reactor. An emulsion feed composed of 120 g of water, 9.94 g of Aeorsol 18, 7.2 g of TERGITOL NP-40 (70%), 241.47 g of styrene, 81.62 g of isooctyl acrylate, 17.0 g of glycidyl methacrylate, and 0.52 g of the sodium 2-acrylamido-2-methylpropanesulfonate (50% in water) was begun at 1.72 g/min. Five minutes after the first emulsion feed was begun, an initiator solution composed of 1.3 g of sodium persulfate dissolved in 33.5 g of water was fed at 0.160 g/min. Five minutes after the last feed, an initiator solution of 1.03 g of t-butyl hydroperoxide, and 0.72 g of sodium formaldehyde sulfoxylate dissolved in 12 g of water was charged and heating continued for 30 minutes. The latex was then filtered through 100 mesh wire screen. Solids level, 42.7; pH, 7.9; amount of dried material (100 mesh screen), 6.95 g; Electron Micrograph, 180 nm.

EXAMPLE 8
Evaluation of Films prepared from Blend of Epoxide-Containing and PEI-Containing Waterborne Particles for Solvent Resistance Blends were prepared by adding the appropriate weight fraction of PEI-containing latex to enamine-containing latex (dry resin on dry resin). Typically, to 100 g of epoxide-containing latex (Example 1) were added the appropriate weighed amount of PEI-containing latex (33.75 g of Example 2) such that the weight fraction of PEI-containing latexes represented a weight fraction of 25% (dry resin on dry resin). All formulations were prepared in a similar manner with varying weight fractions of PEI-containing latex. After the blends were prepared, 1 phr of SURFYNOL 104 DPM (1 g of active SURFYNOL 104 per 100 g of dried resin) was added as a wetting agent. Wet films were cast over aluminum chromate treated panels (0.025"×3"×9") then cured in a forced-air oven or allowed to cure at room temperature at a relative humidity of 50%. Dried film thicknesses were measured, and the solvent resistance determined by measuring the films resistance to methyl ethyl ketone double rubs. The results are reported in the tables and figures below:

TABLE 1

| Examples (Latex #) | Examples (Latex #) | Vol. Frac. (PEI Latex) | Dry Film Thickness 0.97–1.7 | Cure Time (30 mins) Cure Temp /Cure Temp (° C.) | MEK DR |
|---|---|---|---|---|---|
| 1 | 2 | 25 | 1.0/1.6 | 105/120 | 71/197 |
| 1 | 3 | 25 | 1.1/1.4 | 105/120 | 64/175 |
| 1 | 5 | 25 | 1.0/1.2 | 105/120 | 63/146 |
| 1 | 6 | 25 | 1.0/1.4 | 105/120 | 46/125 |
| 4 | 2 | 25 | 1.0/1.4 | 105/120 | 158/220 |
| 4 | 3 | 25 | 1.0/1.6 | 105/120 | 52/306 |
| 4 | 5 | 25 | 1.3/1.7 | 120° C. | 32/110 |
| 4 | 6 | 25 | 0.91/1.6 | 105/120 | 17/92 |
| 1 | 7 | 38 | 1.3–1.8 | 150° C. | 143 |

The first 8 blends in Table 1 were analyzed by least squares analysis. The results are shown in FIG. 1.

FIG. 1. Constant contour plots of methyl ethyl ketone double rubs as a function of size of epoxide-containing latexes, and PEI-containing latexes. The PEI-containing latexes were added at a volume fraction of 25% (dry resin on dry resin). The plots were constructed assuming a one to one stoichiometric level of N—H to enamine. Films were cured for 30 minutes in a forced-air oven.

TABLE 2

| Examples (Latex #) | Examples (Latex #) | Vol. Frac. (PEI Latex) | Dry Film Thickness (mils) | Cure Time/ Cure Temp. | MEK DR (1.0 mil/1.5 mil) |
|---|---|---|---|---|---|
| 1 | 2 | 25 | 1.0/1.5 | 2 days RT | 24/47 |
| 1 | 3 | 25 | 1.0/1.5 | 2 days RT | 28/53 |

TABLE 2-continued

| Examples (Latex #) | Examples (Latex #) | Vol. Frac. (PEI Latex) | Dry Film Thickness (mils) | Cure Time/ Cure Temp. | MEK DR (1.0 mil/1.5 mil) |
|---|---|---|---|---|---|
| 1 | 5 | 25 | 1.0/1.5 | 2 days RT | 28/49 |
| 1 | 6 | 25 | 1.0/1.5 | 2 days RT | 29/51 |
| 4 | 2 | 25 | 1.0/1.5 | 2 days RT | 35/61 |
| 4 | 3 | 25 | 1.0/1.5 | 2 days RT | 28/50 |
| 4 | 5 | 25 | 1.0/1.5 | 2 days RT | 38/65 |
| 4 | 6 | 25 | 1.0/1.5 | 2 days RT | 31/56 |
| 1 | 2 | 25 | 1.0/1.5 | 21 days RT | 22/47 |
| 1 | 3 | 25 | 1.0/1.5 | 21 days RT | 24/49 |
| 1 | 5 | 25 | 1.0/1.5 | 21 days RT | 32/66 |
| 1 | 6 | 25 | 1.0/1.5 | 21 days RT | 24/46 |
| 4 | 2 | 25 | 1.0/1.5 | 21 days RT | 66/129 |
| 4 | 3 | 25 | 1.0/1.5 | 21 days RT | 34/56 |
| 4 | 5 | 25 | 1.0/1.5 | 21 days RT | 55/99 |
| 4 | 6 | 25 | 1.0/1.5 | 21 days RT | 36/57 |

EXAMPLE 9

Preparation of Films from Blends of Epoxide-Containing and PEI-Containing Waterborne Particles Blends were prepared by adding the appropriate weight fraction of PEI-containing latex to enamine-containing latex (dry resin on dry resin). Typically, to 100 g of epoxide-containing latex (Example 1) were added the appropriate weighed amount of PEI-containing latex (33.75 g of Example 2) such that the weight fraction of PEI-containing latexes represented a weight fraction of 25% (dry resin on dry resin). All formulations were prepared in a similar manner with varying weight fractions of PEI-containing latex. After the blends were prepared, 1 phr of SURFYNOL 104 DPM (1 g of active SURFYNOL 104 per 100 g of dried resin) was added as a wetting agent. The blends and their MFFT values are shown in Table 3 below.

TABLE 3

| Example | Epoxy-Containing Latex: | PEI-containing Latex | Volume Fraction PEI Latex: | Visual MFFT: (degree C.) | Resist MFFT: (degree C.) |
|---|---|---|---|---|---|
| 9A | 1 | 2 | 0.25 | 10.6 | 15.6 |
| 9B | 1 | 3 | 0.25 | 11.0 | 13.0 |
| 9C | 1 | 5 | 0.25 | 1.2 | 7.0 |
| 9D | 1 | 6 | 0.25 | <0 | 5.8 |
| 9E | 4 | 2 | 0.25 | 3.0 | 10.7 |
| 9F | 4 | 3 | 0.25 | 2.0 | 11.8 |
| 9G | 4 | 5 | 0.25 | <0 | 12.4 |
| 9H | 4 | 6 | 0.25 | <0 | 11.6 |

EXAMPLE 10

Evaluation of Films prepared from Examples 1–6 and 9 for Tensile Properties

Wet films were cast release paper then cured in a forced-air oven at 120° C. for 30 minutes or allowed to cure ambiently for 8 days in the CTH room. Free film samples were analyzed for tensile properties and results of thermal cure are shown in Table 4, below, while results from 8 day ambient cure are shown in Table 5, below.

TABLE 4

| 120° C. Cure for 30 minutes Example Code: | Ultimate Break: (psi) | Elong: (%) | Energy: (in.lb/in$^3$) | Initial Modulus: (ksi) | Yield: Break: (psi) | Elong: (%) | Yellowness Index |
|---|---|---|---|---|---|---|---|
| 2 | 1422 | 145.1 | 1242 | 3.4 | 309 | 17.9 | — |
| 3 | 1496 | 129.5 | 1012 | 2.5 | 302 | 20.5 | — |
| 5 | 1708 | 117.4 | 867 | 3.1 | 298 | 20.7 | — |
| 6 | 453 | 35.8 | 104 | 4.3 | 186 | 10.6 | — |
| 1 | 2011 | 252.3 | 3134 | 31.2 | 776 | 8.2 | 0.89 |
| 9A | 1674 | 80.8 | 934 | 24.3 | 782 | 8.7 | 3.79 |

TABLE 4-continued

| 120° C. Cure for 30 minutes Example Code: | Ultimate Break: (psi) | Elong: (%) | Energy: (in.lb/in$^3$) | Initial Modulus: (ksi) | Yield: Break: (psi) | Elong: (%) | Yellow-ness Index |
|---|---|---|---|---|---|---|---|
| 9B | 1754 | 85.2 | 986 | 21.4 | 717 | 8.9 | 4.85 |
| 9C | 1833 | 89.5 | 1056 | 25.7 | 750 | 8.5 | 3.47 |
| 9D | 1871 | 90.7 | 1054 | 19.4 | 651 | 9.5 | 4.44 |
| 4 | 1366 | 329.5 | 2136 | 10.0 | 264 | 16.1 | 0.37 |
| 9E | 1954 | 70.9 | 860 | 24.2 | 755 | 8.7 | 4.52 |
| 9F | 2269 | 71.5 | 997 | 31.8 | 883 | 8.2 | 5.61 |
| 9G | 2194 | 83.2 | 1043 | 26.0 | 712 | 8.6 | 3.85 |
| 9H | 2606 | 86.2 | 1269 | 29.1 | 803 | 8.9 | 4.62 |

TABLE 5

| 8 Day Ambient Cure Example Code | Ultimate Break: (psi) | Elong: (%) | Energy: (in.lb/in$^3$) | Initial Modulus: (ksi) | Yield: Break: (psi) | Elong: (%) | Yellow-ness Index |
|---|---|---|---|---|---|---|---|
| 2 | 683 | 168.6 | 767 | 4.3 | 161 | 11.2 | — |
| 3 | 496 | 110.2 | 328 | 3.0 | 120 | 11.5 | — |
| 5 | 1153 | 102.4 | 590 | 4.5 | 249 | 14.3 | — |
| 6 | 811 | 87.7 | 341 | 2.5 | 169 | 15.4 | — |
| 1 | 1169 | 185.3 | 1585 | 20.3 | 624 | 8.7 | 0.59 |
| 9A | 1211 | 115.0 | 909 | 9.1 | 479 | 11.3 | 1.89 |
| 9B | 1193 | 116.0 | 895 | 11.9 | 445 | 9.7 | 2.38 |
| 9C | 1478 | 114.7 | 980 | 10.6 | 479 | 11.1 | 1.96 |
| 9D | 1229 | 107.5 | 780 | 7.2 | 411 | 11.6 | 2.21 |
| 4 | 1043 | 265.0 | 1548 | 18.8 | 305 | 8.1 | 0.11 |
| 9E | 1896 | 140.3 | 1424 | 11.7 | 429 | 11.2 | 2.4 |
| 9F | 1900 | 138.7 | 1371 | 9.3 | 405 | 13.1 | 2.51 |
| 9G | 2050 | 126.3 | 1273 | 12.2 | 435 | 11.6 | 0.05 |
| 9H | 1762 | 116.7 | 1026 | 11.1 | 395 | 11.3 | 1.57 |

EXAMPLE 11

Evaluation of Films prepared from Examples 1–6 and 9 and for Gel Fraction and Swell Ratio Properties Wet films were cast release paper then cured in a forced-air oven at 120° C. for 30 minutes or allowed to cure ambiently for 8 days in the CTH room. Free film samples were analyzed for for Gel Fraction (Table 6) and Swell Ratio Properties (Table 7 and 8) and results of thermal cure are shown below.

TABLE 6

Latex and Film Gel Fractions in Acetone (THF)

| Example | LGF: | 2 Days | 8 days | 21 days | 40 days | 120° C., 30' |
|---|---|---|---|---|---|---|
| 1 |  |  | 87 | 89 | 90 | 91 | (92) |
| 2 |  |  | 84 |  |  | 93 |
| 3 |  |  | 83 |  |  | 95 |
| 4 |  | 83 | 86 | 87 | 87 | (86) |
| 5 |  |  | 89 |  |  | 94 |
| 6 |  |  | 85 |  |  | 93 |
| 9A | 88 | 90 | 92 | 91 | 93 | (95) |
| 9B | 87 | 90 | 93 | 92 | 94 | (96) |
| 9C | 88 | 92 | 94 | 94 | 96 | (95) |
| 9D | 88 | 91 | 92 | 93 | 94 | (96) |
| 9E | 85 | 89 | 92 | 92 | 93 | (93) |
| 9F | 86 | 89 | 91 | 92 | 93 | (95) |
| 9G | 85 | 89 | 92 | 92 | 92 | (92) |
| 9H | 83 | 89 | 92 | 91 | 92 | (93) |

TABLE 7

Film Swell Ratios in THF

| Example | 2 Days | 8 days | 21 days | 40 days | 120° C., 30' |
|---|---|---|---|---|---|
| 1 | 12.4 | 12.2 | 12.0 | 10.8 | 11.6 |
| 4 | 15.3 | 13.0 | 12.5 | 10.6 | 12.2 |
| 9A | 5.9 | 5.5 | 5.4 | 5.3 | 4.9 |
| 9B | 5.5 | 5.0 | 4.9 | 5.7 | 4.4 |
| 9C | 6.2 | 5.5 | 4.7 | 5.2 | 4.9 |
| 9D | 7.1 | 4.8 | 5.4 | 4.7 | 4.7 |
| 9E | 5.8 | 4.8 | 4.6 | 4.6 | 4.2 |
| 9F | 6.3 | 4.6 | 4.6 | 4.2 | 4.2 |
| 9G | 6.7 | 4.3 | 6.1 | 4.6 | 4.2 |
| 9H | 6.0 | 6.2 | 4.9 | 4.7 | 4.4 |

TABLE 8

Latex and Film Swell Ratios in acetone

| Example | LSR | 2 Days | 8 days | 21 days | 40 days | 120° C., 30' |
|---|---|---|---|---|---|---|
| 1 |  | 7.0 | 7.6 | 7.3 | 7.1 |  |
| 2 |  |  | 3.7 |  |  | 2.9 |
| 3 |  |  | 3.9 |  |  | 2.7 |
| 4 |  | 9.8 | 8.2 | 7.6 | 7.3 |  |
| 5 |  |  | 3.2 |  |  | 3.0 |
| 6 |  |  | 3.4 |  |  | 3.1 |
| 9A | 5.8 | 4.9 | 4.6 | 4.4 | 4.3 |
| 9B | 5.2 | 5.0 | 4.3 | 4.4 | 4.3 |
| 9C | 5.6 | 4.8 | 4.3 | 3.9 | 4.7 |
| 9D | 5.5 | 4.1 | 3.9 | 4.2 | 4.9 |
| 9E | 3.9 | 4.6 | 3.4 | 4.0 | 3.7 |

TABLE 8-continued

Latex and Film Swell Ratios in acetone

| Example | LSR | 2 Days | 8 days | 21 days | 40 days | 120° C., 30' |
|---------|-----|--------|--------|---------|---------|--------------|
| 9F | 4.3 | 5.0 | 4.0 | 4.4 | 3.9 | |
| 9G | 6.8 | 3.9 | 3.3 | 4.5 | 3.8 | |
| 9H | 5.9 | 4.7 | 4.8 | 4.1 | 4.3 | |

EXAMPLE 12

Preparation of Amino-Functional Particle (Mole Ratio of N—H Group to Acetoacetoxy Group was 2.12)

To a 3000 mL resin kettle equipped with a condenser, nitrogen purge, and subsurface feed tube were added 640 g of water, 4.05 g of TREM LF-40, 1.93 g of TERGITOL NP-40 (70%), 8 g of sodium carbonate, 55.23 g of methyl methacrylate, 4.03 g of styrene, 47.40 g of 2-ethylhexyl acrylate, 20.15 g of acetoacetoxyethyl methacrylate, and 0.336 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 339.33 g of methyl methacrylate, 24.8 g of styrene, 291.16 g of 2-ethylhexyl acrylate, and 2.06 g of trimethylolpropane triacrylate was begun at 8.38 g/min. Five minutes after the first emulsion feed was begun, an initiator solution composed of 4.36 g of sodium persulfate dissolved in 112 g of water was fed at 0.536 g/min. After the first emulsion feed was completed, a second emulsion feed composed of 171 g of water, 12.79 g of AEROSOL 18, 5.09 g of TERGITOL NP-40 (70%), 211.03 g of styrene, 80.0 g of 2-ethylhexyl acrylate, 123.77 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and filtered through 100 mesh wire screen. Solids level, 46.64; pH, 8.2; amount of dried material (100 mesh screen), 24.65 g; Particle Size, (by Electron Micrograph), 450 nm. Latex gel fraction in acetone was 70.7% and swell ratio was 6.5. To 2500 g of this latex were added over 15 minutes 115 g of poly(ethylenimine) (50%). Solids, 46.6%; pH, 10.4; Particle Size (by Electron Microscopy), 450 nm. Latex gel fraction in acetone was 84.6 and swell ratio was 5.4. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

EXAMPLE 12b

Preparation of Amine-Functional Particle

To a 1000 mL resin kettle equipped with a condenser, nitrogen purge, and subsurface feed tube were added 192 g of water, 1.215 g of TREM LF-40, 0.58 g of TERGITOL NP-40 (70%), 13.55 g of methyl methacrylate, 1.21 g of styrene, 17.24 g of 2-ethylhexyl acrylate, 0.101 g of trimethylolpropane triacrylate, 6.05 g of acetoacetoxyethyl methacrylate, and 2.4 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 83.23 g of methyl methacrylate, 7.44 g of styrene, 105.91 g of 2-ethylhexyl acrylate, and 0.62 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.87 g of AEROSOL 18, 1.53 g of TERGITOL NP-40 (70%), 63.31 g of styrene, 24 g of 2-ethylhexyl acrylate, 37.13 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled then 69.51 g of LUHYDRAN G35 (50% in water) was fed in over 30 minutes. The emulsion was filtered through 100 mesh wire screen. Solids level, 46.57; amount of dried material (100 mesh screen), 0.40 g. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

EXAMPLE 12c

Preparation of Amine-Functional Particle (Mole Ratio of N—H Group to Acetoacetoxy Group was 2.12)

To a 1000 mL resin kettle equipped with a condenser, nitrogen purge, and subsurface feed tube were added 192 g of water, 1.215 g of TREM LF-40, 0.58 g of TERGITOL NP-40 (70%), 13.55 g of methyl methacrylate, 1.31 g of styrene, 17.14 g of 2-ethylhexyl acrylate, 0.101 g of trimethylolpropane triacrylate, 6.05 g of acetoacetoxyethyl methacrylate, and 2.4 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 83.23 g of methyl methacrylate, 8.06 g of styrene, 105.29 g of 2-ethylhexyl acrylate, and 0.62 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.87 g of AEROSOL 18, 1.53 g of TERGITOL NP-40 (70%), 62.59 g of styrene, 24 g of 2-ethylhexyl acrylate, 0.72 g of 2-ethylhexyl 3-mercaptopropionate, 37.13 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled then 69.51 g of LUHYDRAN G35 (50% in water) was fed in over 15 minutes. The emulsion was filtered through 100 mesh wire screen. Solids level, 46.59; amount of dried material (100 mesh screen), 0.15 g. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

EXAMPLE 13
Preparation of Coreactive Waterborne Particle Containing Enamine Functionality To a 1000 mL resin kettle equipped with a condenser, nitrogen purge, and subsurface feed tube were added 192 g of water, 1.215 g of TREM LF-40, 0.58 g of TERGITOL NP-40 (70%), 2.19 g of sodium carbonate, 13.28 g of methyl methacrylate, 2.48 g of styrene, 17.12 g of 2-ethylhexyl acrylate, and 0.076 g of trimethylolpropane triacrylate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 81.53 g of methyl methacrylate, 15.22 g of styrene, 105.19 g of 2-ethylhexyl acrylate, and 0.46 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.87 g of AEROSOL 18, 1.53 g of TERGITOL NP-40 (70%), 54.26 g of styrene, 27 g of 2-ethylhexyl acrylate, 43.17 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled then 12.9 g of ammonium hydroxide (28% in water) was fed in over 15 minutes. The emulsion was filtered through 100 mesh wire screen. Solids level, 46.05; pH, 10.05; amount of dried material (100 mesh screen), 0.74 g; unimodal particle size (by laser light scattering and TEM) 225 nm. MFFT (visual) was 16.7° C. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of ammonium hydroxide.

EXAMPLE 14
Preparation of Coreactive Waterborne Particle Containing Acetoacetoxy and Enamine Functionality To a 1000 mL resin kettle equipped with a condenser, nitrogen purge, and subsurface feed tube were added 192 g of water, 1.215 g of TREM LF-40, 0.58 g of TERGITOL NP-40 (70%), 13.28 g of methyl methacrylate, 2.53 g of styrene, 17.07 g of 2-ethylhexyl acrylate, 0.076 g of trimethylolpropane triacrylate, and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 81.53 g of methyl methacrylate, 15.53 g of styrene, 104.88 g of 2-ethylhexyl acrylate, and 0.46 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.84 g of AEROSOL 18, 1.53 g of TERGITOL NP-40 (70%), 53.90 g of styrene, 27 g of 2-ethylhexyl acrylate, 0.36 g of 2-ethylhexyl 3-mercaptopropionate, 43.17 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled then 12.9 g of ammonium hydroxide (28% in water) was fed in over 15 minutes. The emulsion was filtered through 100 mesh wire screen. Solids level, 45.82; pH, 10.11; amount of dried material (100 mesh screen), 0.74 g. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of ammonium hydroxide.

EXAMPLE 15
Preparation of Coreactive Waterborne Particle Containing Acetoacetoxy and Enamine Functionality To a 1000 mL resin kettle equipped with a condenser, nitrogen purge, and subsurface feed tube were added 192 g of water, 1.215 g of TREM LF-40, 0.58 g of TERGITOL NP-40 (70%), 13.28 g of methyl methacrylate, 2.58 g of styrene, 17.02 g of 2-ethylhexyl acrylate, 0.076 g of trimethylolpropane triacrylate, and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 81.53 g of methyl methacrylate, 15.83 g of styrene, 104.57 g of 2-ethylhexyl acrylate, and 0.46 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.84 g of AEROSOL 18, 1.53 g of TERGITOL NP-40 (70%), 53.54 g of styrene, 27 g of 2-ethylhexyl acrylate, 0.72 g of 2-ethylhexyl 3-mercaptopropionate, 43.17 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled then 12.9 g of ammonium hydroxide (28% in water) was fed in over 15 minutes. The emulsion was filtered through 100 mesh wire screen. Solids level, 45.21%; pH, 10.04; amount of dried material (100 mesh screen), 1.14 g. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of ammonium hydroxide.

EXAMPLE 16
Preparation of Coreactive Waterborne Particle Containing Enamine Functionality To a 1000 mL resin kettle equipped with a condenser, nitrogen purge, and subsurface feed tube were added 192 g of water, 1.215 g of TREM LF-40, 0.58 g of TERGITOL NP-40 (70%), 13.28 g of methyl methacrylate, 2.63 g of styrene, 16.97 g of 2-ethylhexyl acrylate, 0.076 g of trimethylolpropane triacrylate, and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 81.53 g of methyl methacrylate, 16.14 g of styrene, 104.26 g of 2-ethylhexyl acrylate, and 0.46 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.84 g of AEROSOL 18, 1.53 g of TERGITOL NP-40 (70%), 53.18 g of styrene, 27 g of 2-ethylhexyl acrylate, 1.08 g of 2-ethylhexyl 3-mercaptopropionate, 43.17 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled then 12.9 g of ammonium hydroxide (28% in water) was fed in over 15 minutes. The emulsion was filtered through 100 mesh wire screen. Solids level, 46.48 %; pH, 9.87; amount of dried material (100 mesh screen), 0.85 g. Infrared analysis of clear films cast over ZnSe showed an absorption at 1653 $cm^{-1}$ and 1565 $cm^{-1}$ and a disappearance of the absorbencies at 1631 $cm^{-1}$ and 1655 $cm^{-1}$ after addition of ammonium hydroxide.

EXAMPLE 17

Preparation of Coreactive Waterborne Particle Containing Enamine Functionality

To a 1000 mL resin kettle equipped with a condenser, nitrogen purge, and subsurface feed tube were added 192 g of water, 1.215 g of TREM LF-40, 0.58 g of TERGITOL NP-40 (70%), 13.28 g of methyl methacrylate, 2.68 g of styrene, 16.92 g of 2-ethylhexyl acrylate, 0.076 g of trimethylolpropane triacrylate, and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 81.53 g of methyl methacrylate, 16.45 g of styrene, 103.95 g of 2-ethylhexyl acrylate, and 0.46 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.84 g of AEROSOL 18, 1.53 g of TERGITOL NP-40 (70%), 52.85 g of styrene, 27 g of 2-ethylhexyl acrylate, 1.44 g of 2-ethylhexyl 3-mercaptopropionate, 43.17 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled then 12.9 g of ammonium hydroxide (28% in water) was fed in over 15 minutes. The emulsion was filtered through 100 mesh wire screen. Solids level, 46.04%; pH, 9.72; amount of dried material (100 mesh screen), 0.47 g, particle size (by TEM) 225 nm. Infrared analysis of clear films cast over ZnSe showed an absorption at 1653 $cm^{-1}$ and 1565 $cm^{-1}$ and a disappearance of the absorbencies at 1631 $cm^{-1}$ and 1655 $cm^{-1}$ after addition of ammonium hydroxide.

EXAMPLE 18

Preparation of Coreactive Waterborne Particle Containing Acetoacetoxy Functionality To a 1000 mL resin kettle equipped with a condenser, nitrogen purge, and subsurface feed tube were added 293.8 g of water, 1.34 g of TREM LF-40, 1.79 g of TERGITOL NP-40 (70%), 12.71 g of styrene, 3.84 g of iso-octyl acrylate, 1.35 g of m-tetramethylxylene isocyanate, 0.014 g of sodium 2-acrylamido-2-methylpropanesulfonate (50% in water) and 2.05 g of sodium carbonate. A nitrogen purge was begun, then the contents of the reactor brought up to 80° C. at 400 rpm. After reaching 80° C., an initiator charge composed of 2.3 g of sodium persulfate dissolved in 13 g of water was added to the reactor. An emulsion feed composed of 120 g of water, 7.16 g of TERGITOL NP-40 (70% in water), 9.94 g of AEROSOL 18, 241.47 g of styrene, 73.02 g of isooctyl acrylate, and 25.61 g of acetoacetoxy ethyl methacrylate, and 0.52 g of the sodium 2-acrylamido-2-methylpropanesulfonate (50% in water) was fed at 1.72 g/min. Five minutes after the first emulsion feed was begun, an initiator solution composed of 1.3 g of sodium persulfate dissolved in 33.5 g of water was fed at 0.16 g/min. After the last feed, the reaction was held for 10 minutes at 80° C. then cooled to 65° C. over the next 20 minutes. Over the next 30 minutes, a solution of 1.03 g of t-butyl hydroperoxide (70% in water) and 0.72 g of sodium formaldehyde sulfoxylate in 12 g of water was fed into the reactor while heating continued. After cooling, the emulsion was filtered through 100 mesh wire screen. Dried solids collected on 100 mesh screen=3.26 g. Total solids level was 43.84%, particle size was 151 nm by TEM and pH was 7.41.

EXAMPLE 18b

Preparation of Coreactive Waterborne Particle Containing Acetoacetoxy Functionality To a 1000 mL resin kettle equipped with a condenser, nitrogen purge, and subsurface feed tube were added 192 g of water, 1.215 g of TREM LF-40, 0.58 g of TERGITOL NP-40 (70%), 13.50 g of methyl methacrylate, 4.20 g of styrene, 15.15 g of 2-ethylhexyl acrylate, 0.101 g of trimethylolpropane triacrylate, and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70%), 82.92 g of methyl methacrylate, 25.80 g of styrene, 93.06 g of 2-ethylhexyl acrylate, and 0.619 g of trimethylolpropane triacrylate was begun at 8.38 g/min. Five minutes after the first emulsion feed was begun, an initiator solution composed of 1.31 g of sodium persulfate dissolved in 33.67 g of water was fed at 0.536 g/min. After the first emulsion feed was completed, a second emulsion feed composed of 51.3 g of water, 3.84 g of AEROSOL 18, 1.53 g of TERGITOL NP-40 (70%), 41.96 g of styrene, 41.1 g of 2-ethylhexyl acrylate, 7.20 g of dimethylaminoethyl methacrylate, 34.18 g of acetoacetoxyethyl methacrylate, and 0.50 g of the sodium 2-acrylamido-2-methylpropanesulfonate (50% in water) was fed at 8.38 g/min. Five minutes after the last feed, an initiator solution of 0.40 g of t-butyl hydroperoxide, and 0.40 g of sodium formaldehyde sulfoxylate dissolved in 12.1 g of water was charged and heating continued for 30 minutes. The emulsion was cooled. The emulsion was filtered through 100 mesh wire screen. Solids level, 46.08%; amount of dried material (100 mesh screen), 2.03 g, particle size (by TEM) 225 nm.

EXAMPLE 19
Preparation of Coreactive Waterborne Particles Containing Epoxy Functionality To a 1000 mL resin kettle equipped with a condenser, nitrogen purge, and subsurface feed tube were added 192 g of water, 1.22 g of TREM LF-40, 0.579 g of TERGITOL NP-40 (70%), 13.28 g of methyl methacrylate, 2.15 g of styrene, 17.45 g of 2-ethylhexyl acrylate, 0.076 g of trimethylolpropane triacrylate and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70% in water), 81.53 g of methyl methacrylate, 13.22 g of styrene, 107.19 g of 2-ethylhexyl acrylate, and 0.46 g of trimethylolpropane triacrylate was begun at 5.248 g/min. Five minutes after the first emulsion feed was begun, an initiator solution composed of 1.31 g of sodium persulfate dissolved in 33.67 g of water was fed at 0.336 g/min. After the first emulsion feed was completed, a second emulsion feed composed of 51.3 g of water, 3.84 g of AEROSOL 18, 1.53 g of TERGITOL NP-40 (68% in water), 56.59 g of styrene, 49.5 g of 2-ethylhexyl acrylate, 18.35 g of glycidyl methacrylate, and 0.51 g of the sodium 2-acrylamido-2-methylpropanesulfonate (50% in water) was fed at 5.25 g/min. After the last feed, the reaction was held for 10 minutes at 80° C. then cooled to 65 ° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=0.29 g. Total solids level of 46.24% and pH was 8.54.

EXAMPLE 20
Preparation of Coreactive Waterborne Particles Containing Epoxy Functionality To a 1000 mL resin kettle equipped with a condenser, nitrogen purge, and subsurface feed tube were added 192 g of water, 1.22 g of TREM LF-40, 0.579 g of TERGITOL NP-40 (70%), 13.28 g of methyl methacrylate, 2.20 g of styrene, 17.40 g of 2-ethylhexyl acrylate, 0.076 g of trimethylolpropane triacrylate and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70% in water), 81.53 g of methyl methacrylate, 13.53 g of styrene, 106.88 g of 2-ethylhexyl acrylate, and 0.46 g of trimethylolpropane triacrylate was begun at 5.248 g/min. Five minutes after the first emulsion feed was begun, an initiator solution composed of 1.31 g of sodium persulfate dissolved in 33.67 g of water was fed at 0.336 g/min. After the first emulsion feed was completed, a second emulsion feed composed of 51.3 g of water, 3.84 g of AEROSOL 18, 1.53 g of TERGITOL NP-40 (68% in water), 56.23 g of styrene, 49.5 g of 2-ethylhexyl acrylate, 18.35 g of glycidyl methacrylate, 0.36 g of 2-ethylhexyl 3-mercaptopropionate and 0.51 g of the sodium 2-acrylamido-2-methylpropanesulfonate (50% in water) was fed at 5.25 g/min. After the last feed, the reaction was held for 10 minutes at 80° C. then cooled to 65 ° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=1.49 g. Total solids level of 46.51% and pH was 8.84.

EXAMPLE 21
Preparation of Coreactive Waterborne Particles Containing Epoxy Functionality To a 1000 mL resin kettle equipped with a condenser, nitrogen purge, and subsurface feed tube were added 192 g of water, 1.22 g of TREM LF-40, 0.579 g of TERGITOL NP-40 (70%), 13.28 g of methyl methacrylate, 2.20 g of styrene, 17.40 g of 2-ethylhexyl acrylate, 0.076 g of trimethylolpropane triacrylate and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70% in water), 81.53 g of methyl methacrylate, 13.53 g of styrene, 106.88 g of 2-ethylhexyl acrylate, and 0.46 g of trimethylolpropane triacrylate was begun at 5.248 g/min. Five minutes after the first emulsion feed was begun, an initiator solution composed of 1.31 g of sodium persulfate dissolved in 33.67 g of water was fed at 0.336 g/min. After the first emulsion feed was completed, a second emulsion feed composed of 51.3 g of water, 3.84 g of AEROSOL 18, 1.53 g of TERGITOL NP-40 (68% in water), 56.23 g of styrene, 49.5 g of 2-ethylhexyl acrylate, 18.35 g of glycidyl methacrylate, 0.72 g of 2-ethylhexyl 3-mercaptopropionate and 0.51 g of the sodium 2-acrylamido-2-methylpropanesulfonate (50% in water) was fed at 5.25 g/min. After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=1.49 g. Total solids level of 46.51% and pH was 8.84.

EXAMPLE 22
Preparation of Coreactive Waterborne Particles Containing Epoxy Functionality To a 1000 mL resin kettle equipped with a condenser, nitrogen purge, and subsurface feed tube were added 192 g of water, 1.22 g of TREM LF-40, 0.579 g of TERGITOL NP-40 (70%), 13.28 g of methyl methacrylate, 2.30 g of styrene, 17.30 g of 2-ethylhexyl acrylate, 0.076 g of trimethylolpropane triacrylate and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70% in water), 81.53 g of methyl methacrylate, 14.14 g of styrene, 106.26 g of 2-ethylhexyl acrylate, and 0.46 g of trimethylolpropane triacrylate was begun at 5.248 g/min. Five minutes after the first emulsion feed was begun, an initiator solution composed of 1.31 g of sodium persulfate dissolved in 33.67 g of water was fed at 0.336 g/min. After the first emulsion feed was completed, a second emulsion feed composed of 51.3 g of water, 3.84 g of AEROSOL 18, 1.53 g of TERGITOL NP-40 (68% in water), 55.51 g of styrene, 49.5 g of 2-ethylhexyl acrylate, 18.35 g of glycidyl methacrylate, 1.08 g of 2-ethylhexyl 3-mercaptopropionate and 0.50 g of the sodium 2-acrylamido-2-methylpropanesulfonate (50% in water) was fed at 5.25 g/min. After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the reactor was then charged with a solution of 0.52 g of isoascorbic acid in 16 g water and 0.52 g of 0.5% iron (II) sulfate, and 0.52 g of t-butyl hydroperoxide (70% in water). After setting overnight, the emulsion was filtered through 100 mesh wire screen. Dried solids collected on 100 mesh screen=0.71 g. Total solids level of 46.74% and pH was 8.54.

EXAMPLE 23
Preparation of Coreactive Waterborne Particles Containing Epoxy Functionality To a 1000 mL resin kettle equipped with a condenser, nitrogen purge, and subsurface feed tube were added 192 g of water, 1.22 g of TREM LF-40, 0.579 g of TERGITOL NP-40 (70%), 13.28 g of methyl methacrylate, 2.35 g of styrene, 17.25 g of 2-ethylhexyl acrylate, 0.076 g of trimethylolpropane triacrylate and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70% in water), 81.53 g of methyl methacrylate, 14.45 g of styrene, 105.95 g of 2-ethylhexyl acrylate, and 0.46 g of trimethylolpropane triacrylate was begun at 5.248 g/min. Five minutes after the first emulsion feed was begun, an initiator solution composed of 1.31 g of sodium persulfate dissolved in 33.67 g of water was fed at 0.336 g/min. After the first emulsion feed was completed, a second emulsion feed composed of 51.3 g of water, 3.84 g of AEROSOL 18, 1.53 g of TERGITOL NP-40 (68% in water), 55.15 g of styrene, 49.5 g of 2-ethylhexyl acrylate, 18.35 g of glycidyl methacrylate, 1.44 g of 2-ethylhexyl 3-mercaptopropionate and 0.51 g of the sodium 2-acrylamido-2-methylpropanesulfonate (50% in water) was fed at 5.25 g/min. After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=0.79 g. Total solids level of 46.66% and pH was 9.0.

EXAMPLE 24
Preparation of Coreactive Waterborne Particles Containing Epoxy Functionality To a 1000 mL resin kettle equipped with a condenser, nitrogen purge, and subsurface feed tube were added 192 g of water, 1.22 g of TREM LF-40, 0.579 g of TERGITOL NP-40 (70%), 13.28 g of methyl methacrylate, 2.40 g of styrene, 17.20 g of 2-ethylhexyl acrylate, 0.076 g of trimethylolpropane triacrylate and 2.19 g of sodium carbonate. A nitrogen purge was begun, then the contents of the reactor brought up to 80° C. at 400 rpm. After reaching 80° C., an initiator charge composed of 2.31 g of sodium persulfate dissolved in 13.07 g of water was added to the reactor. An emulsion feed composed of 106.5 g of water, 3.51 g of TREM LF-40, 3.06 g of TERGITOL NP-40 (70% in water), 81.53 g of methyl methacrylate, 14.76 g of styrene, 105.64 g of 2-ethylhexyl acrylate, and 0.46 g of trimethylolpropane triacrylate was begun at 5.248 g/min. Five minutes after the first emulsion feed was begun, an initiator solution composed of 1.31 g of sodium persulfate dissolved in 33.67 g of water was fed at 0.336 g/min. After the first emulsion feed was completed, a second emulsion feed composed of 51.3 g of water, 3.84 g of AEROSOL 18, 1.53 g of TERGITOL NP-40 (70% in water), 54.79 g of styrene, 49.5 g of 2-ethylhexyl acrylate, 18.35 g of glycidyl methacrylate, 1.80 g of 2-ethylhexyl 3-mercaptopropionate and 0.50 g of the sodium 2-acrylamido-2-methylpropanesulfonate (50% in water) was fed at 5.25 g/min. After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=0.85 g. Total solids level of 46.64% and pH was 8.75.

EXAMPLE 25
Preparation of Coreactive Waterborne Particles Containing Epoxy Functionality To a 1000 mL resin kettle equipped with a condenser, nitrogen purge, and subsurface feed tube were added 293.8 g of water, 1.34 g of TREM LF-40, 0.70 g of TERGITOL NP-40 (70%), 12.71 g of styrene, 4.30 g of iso-octyl acrylate, 0.895 g of m-tetramethylxylene isocyanate, 0.014 g of sodium 2-acrylamido-2-methylpropanesulfonate (50% in water) and 2.05 g of sodium carbonate. A nitrogen purge was begun, then the contents of the reactor brought up to 80° C. at 400 rpm. After reaching 80° C., an initiator charge composed of 2.3 g of sodium persulfate dissolved in 13 g of water was added to the reactor. An emulsion feed composed of 120 g of water, 7.16 g of TERGITOL NP-40 (70% in water), 9.94 g of AEROSOL 18, 241.47 g of styrene, 81.62 g of isooctyl acrylate, and 17.0 g of glycidyl methacrylate, and 0.52 g of the sodium 2-acrylamido-2-methylpropanesulfonate (50% in water) was fed at 1.72 g/min. Five minutes after the first emulsion feed was begun, an initiator solution composed of 1.3 g of sodium persulfate dissolved in 33.5 g of water was fed at 0.16 g/min. After the last feed, the reaction was held for 10 minutes at 80° C. then cooled to 65 ° C. over the next 20 minutes. Over the next 30 minutes, a solution of 1.03 g of t-butyl hydroperoxide (70% in water) and 0.72 g of sodium formaldehyde sulfoxylate in 12 g of water was fed into the reactor while heating continued. After cooling, the emulsion was filtered through 100 mesh wire screen. Dried solids collected on 100 mesh screen=6.95 g. Total solids level was 42.74%, particle size was 144 nm by TEM and pH was 7.90.

EXAMPLE 26
Preparation of Coreactive Waterborne Particle Containing Carbonate Functionality To a 1000 mL resin kettle equipped with a condenser, nitrogen purge, and subsurface feed tube were added 435.6 g of water, 13.8 g of sodium vinyl sulfonate, 11.43 g of TERGITOL NP-40 (70%), 1.0 g of sodium carbonate, 40 g of a monomer solution composed of 80 g of vinyl acetate, 280 g of VEOVA-10, 20 g of VEOVA-5, and 20 g of vinyl ethylene carbonate. A nitrogen purge was begun, then the contents of the reactor were brought up to 65° C. at 400 rpm. After reaching 65° C., an initiator charge composed of 1.03 g of t-butyl hydroperoxide (70%) and 0.72 g of sodium formaldehyde sulfoxylate dissolved was added to the reactor. After five minutes the remaining monomer solution was fed in over 200 minutes, an initiator solution composed of 2.4 g of t-butyl hydroperoxide dissolved in 80 g of water, and 1.68 g of sodium formaldehyde sulfoxylate dissolved in 80 g were fed into the reactor over 200 minutes. Fifteen minutes after the initiator solutions were completed, the reactor was cooled to 40° C. Post initiators and a catalyst composed of isoascorbic acid (0.53 g), and t-butyl hydroperoxide (0.53 g), and a 1% iron sulfate solution (0.53 g) were charged sequentially to the reactor and heating continued for 30 minutes. Solids, 383.7%, filterable dry solids (100 mesh screen), 3.2 g, pH, 4.64; particle size, 225 nm (Electron Micrographs); IR (carbonate absorption), 1815 $cm^{-1}$.

EXAMPLE 27
Preparation of Coreactive Waterborne Particle Containing Carbonate Functionality To a 1000 mL resin kettle equipped with a condenser, nitrogen purge, and subsurface feed tube were added 435.6 g of water, 13.8 g of sodium vinyl sulfonate, 11.43 g of TERGITOL NP-40 (70%), 1.0 g of sodium carbonate, 40 g of a monomer solution composed of 280 g of vinyl acetate, 40 g of VEOVA-10, 80 g of butyl acrylate, and 20 g of vinyl ethylene carbonate. A nitrogen purge was begun, then the contents of the reactor were brought up to 65° C. at 400 rpm. After reaching 65° C., an initiator charge composed of 1.03 g of t-butyl hydroperoxide (70% aqueous solution) and 0.72 g of sodium formaldehyde surfoxylate dissolved was added to the reactor. After five minutes the remaining monomer solution was fed in over 200 minutes, an initiator solutions composed of 2.4 g of t-butyl hydroperoxide dissolved in 80 g water, and 1.68 g of sodium formaldehyde sulfoxylate dissolved in 80 g were fed into the reactor over 200 minutes. Fifteen minutes after the initiator solutions were completed, the reactor was cooled to 40° C. Post initiators and a catalyst composed of isoascorbic acid (0.53 g), and t-butyl hydroperoxide (0.53 g, 70% aqueous solution), and a 1% iron sulfate solution (0.53 g) were charged sequentially to the reactor and heating continued for 30 minutes. Solids, 38.7%; filterable dry solids (100 mesh screen), 3.2 g; pH, 4.64; particle size, 150 nm (Electron Micrographs); IR (carbonate absorption), 1815 $cm^{-1}$.

EXAMPLE 28
Preparation of Coreactive Waterborne Particle Containing Isocyanate Functionality To a 1000 mL resin kettle equipped with a condenser, nitrogen purge, and subsurface feed tube were added 293.8 g of water, 1.34 g of TREM LF-40, 1.79 g of TERGITOL NP-40 (70%), 2.05 g of sodium carbonate, 12.33 g of styrene, 4.30 g of iso-octyl acrylate, 1.27 g of TMI and 0.014 g of sodium 2-acrylamido-2-methylpropanesulfonate (50% in water). A nitrogen purge was begun, then the contents of the reactor brought up to 80° C. at 400 rpm. After reaching 80° C., an initiator charge composed of 2.3 g of sodium persulfate dissolved in 13 g of water was added to the reactor. An emulsion feed composed of 120 g of water, 7.16 g of NP-40 (70%), 9.94 g of AEROSOL 18, 234.33 g of styrene, 81.62 g of iso-octyl acrylate, 24.15 g of m-tetramethylxylene isocyanate and 0.52 g of sodium 2-acrylamido-2-methylpropanesulfonate (50% in water) was begun at 1.72 g/min. Five minutes after the first emulsion feed was begun, an initiator solution composed of 1.3 g of sodium persulfate dissolved in 33.5 g of water was fed at 0.16 g/min. Five minutes after the last feed, an initiator solution of 1.03 g of t-butyl hydroperoxide, and 0.72 g of sodium formaldehyde sulfoxylate dissolved in 12 g of water was charged and heating continued for 30 minutes. The emulsion was cooled, and filtered through 100 mesh wire screen. Solids level, 39.29. An additional initiator solution consisting of 0.53 g of t-butyl hydroperoxide, 0.53 g of isoascorbic acid and 0.55 g of sodium formaldehyde sulfoxylate was added and the emulsion was allowed to set for one hour. The measured total solids was 42.36%. Next day the total solids was 42.89% and the scrap collected on a 100 mesh screen was 3.90 g with a pH of 6.4.

EXAMPLE 29
Curing and Evaluation of Films Prepared from Blending a PPAE Waterborne Polymer Latex with Coreactive Latexes by Thermal and Ambient Cure Blends were prepared by adding the appropriate weight fraction of PPAE latex to the coreactive latex (dry resin on dry resin). Typically, to 25 g of the coreactive latex was added the appropriate weighed amount of PPAE latex. After the blends were prepared, 1 phr of SURFYNOL 104DPM (1 g of active SURFYNOL 104 DPM) per 100 g of dried resin) was added as a wetting agent. In some cases, TEXANOL ester alcohol was added as a coalescing agent because the blends did not film at room temperature. Wet films were cast over aluminum chromate treated panels (0.025"×3"×9") then cured in a forced air oven or allowed to cure at room temperature in the CTH room. The results are reported in Tables 1 and 2 below. Samples blended with the carbonate coreactive latex appeared yellow after baking.

TABLE 9

| Coreactive Example: | Coreactive Chemistry: | Grams: | PPAE Example: | Grams: | SURFYNOL 104 DPM (g): | TEXANOL Ester Alcohol(g): |
|---|---|---|---|---|---|---|
| 13 | Enamine | 25 | 1 | 24.98 | 0.47 | — |
| 14 | Enamine | 25 | 1 | 24.98 | 0.47 | — |
| 15 | Enamine | 25 | 1 | 24.98 | 0.47 | — |
| 16 | Enamine | 25 | 1 | 24.98 | 0.47 | — |
| 17 | Enamine | 25 | 1 | 24.98 | 0.47 | — |
| 18 | Acetoacetoxy | 25 | 1 | 14.34 | 0.35 | 1.35 |
| 18b | Acetoacetoxy | 25 | 1 | 17.21 | 0.40 | — |
| 18b | Acetoacetoxy | 25 | 1b | 5.65 | 0.29 | — |
| 18b | Acetoacetoxy | 25 | 1c | 5.65 | 0.29 | — |
| 19 | Epoxy | 25 | 1 | 15.99 | 0.39 | — |
| 20 | Epoxy | 25 | 1 | 15.99 | 0.39 | — |
| 21 | Epoxy | 25 | 1 | 15.99 | 0.39 | — |
| 22 | Epoxy | 25 | 1 | 15.99 | 0.39 | — |
| 23 | Epoxy | 25 | 1 | 15.99 | 0.39 | — |
| 24 | Epoxy | 25 | 1 | 15.99 | 0.39 | — |

TABLE 9-continued

| Coreactive Example: | Coreactive Chemistry: | PPAE Grams: | Example: | Grams: | SURFYNOL 104 DPM (g): | TEXANOL Ester Alcohol(g): |
|---|---|---|---|---|---|---|
| 25 | Epoxy | 25 | 1 | 14.28 | 0.35 | 1.35 |
| 26 | Carbonate | 25 | 1 | 14.40 | 0.33 | — |
| 27 | Carbonate | 25 | 1 | 14.40 | 0.33 | — |
| 28 | Isocyanate | 25 | 1 | 14.38 | 0.35 | 1.35 |

TABLE 10

| Coreactive Example blended with Example 1 on Table 1: | MEK double rub per mil of film after 120° C. cure for 30 minutes: | 20° Gloss on films cured at 120° C. cure for 30 minutes: | MEK double rub per mil of film after 150° C. cure for 30 minutes: | 20° Gloss on films cured at 150° C. cure for 30 minutes: | MEK double rub per mil of film after 1 day ambient cure in CTH room: | 20° Gloss on films cured after 1 day ambient cure in CTH room: |
|---|---|---|---|---|---|---|
| 13 | 143 | 68 | — | — | 29 | 47 |
| 14 | 115 | 60 | — | — | 36 | 39 |
| 15 | 75 | 59 | — | — | 30 | 37 |
| 16 | 143 | 60 | — | — | 38 | 42 |
| 17 | 99 | 51 | — | — | 37 | 42 |
| 18 | 35 | 78 | 283 | 88 | — | — |
| 18b | 54 | 70 | — | — | — | — |
| 18b + 13b | 97 | 100 | — | — | — | — |
| 18b + 13c | 143 | 97 | — | — | — | — |
| 19 | 52 | 65 | 33 | 69 | — | — |
| 20 | 47 | 60 | 58 | 64 | — | — |
| 21 | 41 | 63 | 45 | 65 | — | — |
| 22 | 50 | 60 | 47 | 57 | — | — |
| 23 | 35 | 64 | 79 | 63 | — | — |
| 24 | 29 | 58 | 28 | 58 | — | — |
| 25 | 39 | 74 | 110 | 82 | — | — |
| 26 | 10 | 37 | 8 | 36 | — | — |
| 27 | 9 | 36 | 8 | 35 | — | — |
| 28 | 26 | 53 | 54 | 60 | — | — |

EXAMPLE 30

Preparation of Coreactive Waterborne Particles Containing Epoxy Functionality

To a 2000 mL resin kettle equipped with a condenser, nitrogen purge, and subsurface feed tube were added 230 g of water, 3.25 g of HITENOL HS-20, 4.20 g of SURFYNOL 485W, 11.48 g of methyl methacrylate, 4.21 g of 2-ethylhexyl acrylate, 6.75 g of butylmethacrylate, 0.07 g of trimethylolpropane triacrylate, 0.03 g of 2-ethylhexylmercaptopropionate and 2.75 g of sodium carbonate. A nitrogen purge was begun, then the contents of the reactor brought up to 80° C. at 400 rpm. After reaching 80° C., an initiator charge composed of 3.00 g of sodium persulfate dissolved in 15.0 g of water was added to the reactor. An emulsion feed composed of 125.0 g of water, 2.43 g of HITENOL HS-20, 3.20 g of SURFYNOL 485W, 103.28 g of methyl methacrylate, 37.87 g of 2-ethylhexyl acrylate, 60.75 g of butylmethacrylate and 0.61 g of trimethylolpropane triacrylate was begun at 4.24 g/min. Five minutes after the first emulsion feed was begun, an initiator solution composed of 1.50 g of sodium persulfate dissolved in 50.00 g of water was fed at 0.29 g/min. After the first emulsion feed was completed, a second emulsion feed composed of 130 g of water, 2.43 g of HITENOL HS-20, 3.15 g of SURFYNOL 485W, 54.00 g of glycidyl methacrylate, 169.88 g of butylmethacrylate and 0.34 g of 2-ethylhexyl 3-mercaptopropionate was fed at 4.24 g/min. After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=2.55 g. Total solids level of 46% and pH was 7.3.

EXAMPLE 31

Preparation of Coreactive Waterborne Particles Containing Epoxy Functionality

To a 2000 mL resin kettle equipped with a condenser, nitrogen purge, and subsurface feed tube were added 230 g of water, 6.27 g of Hitenol HS-20, 11.48 g of methyl methacrylate, 4.21 g of 2-ethylhexyl acrylate, 6.75 g of butylmethacrylate, 0.07 g of trimethylolpropane triacrylate, 0.03 g of 2-ethylhexylmercaptopropionate and 2.75 g of sodium carbonate. A nitrogen purge was begun, then the contents of the reactor brought up to 80° C. at 400 rpm. After reaching 80° C., an initiator charge composed of 3.00 g of sodium persulfate dissolved in 15.0 g of water was added to the reactor. An emulsion feed composed of 156.0 g of water, 7.31 g of HITENOL HS-20, 103.28 g of methyl methacrylate, 37.87 g of 2-ethylhexyl acrylate, 60.75 g of butylmethacrylate and 0.61 g of trimethylolpropane triacrylate was begun at 4.24 g/min. Five minutes after the first emulsion feed was begun, an initiator solution composed of 1.50 g of sodium persulfate dissolved in 50.00 g of water was fed at 0.29 g/min. After the first emulsion feed was completed, a second emulsion feed composed of 130 g of water, 7.30 g of HITENOL HS-20, 54.00 g of glycidyl methacrylate, 169.88 g of butylmethacrylate and 0.34 g of 2-ethylhexyl 3-mercaptopropionate was fed at 4.24 g/min.

After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=3.25 g. Total solids level of 46% and pH was 7.9.

EXAMPLE 32
Preparation of Coreactive Waterborne Particles Containing Epoxy Functionality To a 2000 mL resin kettle equipped with a condenser, nitrogen purge, and subsurface feed tube were added 230 g of water, 12.16 g AEROSOL 501, 11.48 g of methyl methacrylate, 4.21 g of 2-ethylhexyl acrylate, 6.75 g of butylmethacrylate, 0.07 g of trimethylolpropane triacrylate, 0.03 g of 2-ethylhexylmercaptopropionate and 2.75 g of sodium carbonate. A nitrogen purge was begun, then the contents of the reactor brought up to 80° C. at 400 rpm. After reaching 80° C., an initiator charge composed of 3.00 g of sodium persulfate dissolved in 15.0 g of water was added to the reactor. An emulsion feed composed of 156.0 g of water, 14.16 g AEROSOL 501, 103.28 g of methyl methacrylate, 37.87 g of 2-ethylhexyl acrylate, 60.75 g of butylmethacrylate and 0.61 g of trimethylolpropane triacrylate was begun at 4.24 g/min. Five minutes after the first emulsion feed was begun, an initiator solution composed of 1.50 g of sodium persulfate dissolved in 50.00 g of water was fed at 0.29 g/min. After the first emulsion feed was completed, a second emulsion feed composed of 130 g of water, 14.16 g AEROSOL 501, 54.00 g of glycidyl methacrylate, 169.88 g of butylmethacrylate and 0.34 g of 2-ethylhexyl 3-mercaptopropionate was fed at 4.24 g/min. After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=1.21 g. Total solids level of 46% and pH was 7.9.

EXAMPLE 33
Preparation of Nonreactive Waterborne Particles as Control

To a 2000 mL resin kettle equipped with a condenser, nitrogen purge, and subsurface feed tube were added 230 g of water, 3.25 g of HITENOL HS-20, 4.20 g of SURFYNOL 485W, 11.48 g of methyl methacrylate, 4.21 g of 2-ethylhexyl acrylate, 6.75 g of butylmethacrylate, 0.07 g of trimethylolpropane triacrylate, 0.03 g of 2-ethylhexylmercaptopropionate and 2.75 g of sodium carbonate. A nitrogen purge was begun, then the contents of the reactor brought up to 80° C. at 400 rpm. After reaching 80° C., an initiator charge composed of 3.00 g of sodium persulfate dissolved in 15.0 g of water was added to the reactor. An emulsion feed composed of 125.0 g of water, 2.43 g of HITENOL HS-20, 3.20 g of SURFYNOL 485W, 103.28 g of methyl methacrylate, 37.87 g of 2-ethylhexyl acrylate, 60.75 g of butylmethacrylate and 0.61 g of trimethylolpropane triacrylate was begun at 4.24 g/min. Five minutes after the first emulsion feed was begun, an initiator solution composed of 1.50 g of sodium persulfate dissolved in 50.00 g of water was fed at 0.29 g/min. After the first emulsion feed was completed, a second emulsion feed composed of 130 g of water, 2.43 g of HITENOL HS-20, 3.15 g of SURFYNOL 485W, 54.00 g of glycidyl methacrylate, 169.88 g of butylmethacrylate and 0.34 g of 2-ethylhexyl 3-mercaptopropionate was fed at 4.24 g/min. After the last feed, the reaction was held for 10 minutes at 80° C. then cooled to 65° C. over the next 20 minutes. Over the next 30 minutes, a solution of 0.40 g of t-butyl hydroperoxide (70% in water) and 0.40 g of sodium formaldehyde sulfoxylate in 12.06 g of water was fed into the reactor while heating continued. After cooling, the emulsion was filtered through 100 mesh wire screen. Dried solids collected on 100 mesh screen=2.55 g. Total solids level of 46% and pH was 7.3.

EXAMPLE 34
Curing and Evaluation of Films Prepared from Blending a PPAE Waterborne Polymer Latex with Coreactive Latexes by Ambient Cure Blends were prepared of examples 30 thru 33 by adding the appropriate weight fraction of PPAE latex to the coreactive latex (dry resin on dry resin). Typically, to 25 g of the coreactive latex was added the appropriate weighed amount of PPAE latex. After the blends were prepared, 1 phr of SURFYNOL 104DPM (1 g of active SURFYNOL( 104 DPM per 100 g of dried resin) was added as a wetting agent. In some cases, TEXANOL (ester alcohol) was added as a coalescing agent because the blends did not film at room temperature. Wet films were cast over aluminum chromate treated panels (0.025"×3"×9") then cured at room temperature in the CTH room. The results are reported in Table 11.

TABLE 11

| Correactive Example blended with Example 1 on Table 1: | Coreactive Chemistry | Film Thickness Mils | MEK Double Rubs after 1 week ambient (room temperature) dry | MEK Double Rubs after 2 weeks ambient (room temperature dry |
|---|---|---|---|---|
| 33 | Nonreactive | 1.2 | 17 | 72 |
| 30 | Epoxy | 1.0 | 348 | 374 |
| 31 | Epoxy | 1.2 | 150 | 165 |
| 32 | Epoxy | 1 | 105 | 248 |

EXAMPLE 36

Coatings prepared from blended PPAE waterborne polymer latex with coreactive epoxy functional latexes.

Coatings were prepared and evaluated using the blended emulsions from examples 9D and 9H above.

EXAMPLE 36a

Preparation of Pigment Grind

A 15 gallon grind was prepared using a Premier disperser, as below, and a portion of the grind was used to letdown each specified coating.

| Material: | Volume: |
|---|---|
| Water | 48.00 |
| TAMOL 1124 | 4.00 |
| TRITON CF-10 | 2.00 |
| FOAMASTER AP | 2.00 |
| DOWICIL 75 | 1.00 |
| Disperse well then add under agitation: | |
| TI-PURE R-900 | 200.00 |
| Cowles until the grind passes 7+ Hegman add: | |
| Water | 19.00 |
| Filter through a Fulflo filter and store. | |

EXAMPLE 36b: Preparation of Coatings

| | Weight (g): Example: | |
|---|---|---|
| Material: | 1 | 2 |
| (Emulsion blend used) | (9D) | (9H) |
| Grind 36a | 137.5 | 137.5 |
| Emulsion: | 245 | 245 |
| FOAMASTER AP Premix | 1.0 | 1.0 |
| FOAMASTER VF | 1.5 | 1.5 |
| SURFYNOL 104A | 5.0 | 5.0 |
| Water | 54 | 54 |
| Then add: | | |
| ACRYSOL SCT-275 | 50.0 | 50.0 |

EXAMPLE 36c

Evaluation of Coating Properties

Coating properties were evaluated at appropriate dry times. Wet paint data, gloss, wet adhesion and scrub data are presented on Table 12 below. Color value "b", mudcracking of the paint in a low temperature coalescence test, block and print resistance properties are presented in Table 13 below.

TABLE 12

| | Coating Sample 1 | Coating Sample 2 |
|---|---|---|
| pH | 9.7 | 9.4 |
| KU | 89 | 83 |
| 60 degree gloss | 65 | 75 |
| 20 degree gloss | 24 | 32 |
| 1 day BT† | 25 | 2600 |
| 1 day TF‡ | 3000+ | 3000+ |
| 8 day BT | 19 | 3000+ |
| 8 day TF | 3000+ | 3000+ |
| 8 day scrub | 322 | 324 |
| 15 day scrub | 657 | 552 |
| 22 day scrub | 731 | 574 |

†TB = total break through wet adhesion
‡TF = total failure wet adhesion

TABLE 13

| | Coating Sample 1 | Coating Sample 2 |
|---|---|---|
| "b" color value | 3.1 | 2.5 |
| mud cracking | yes | no |
| 1 day dry - 1 day FTF block | 8 | 8 |
| 1 day dry - 7 days FTF block | 8 | 9 |
| 1 day dry - 1 day print | 6 | 6 |
| 1 day dry - 7 days print | 6 | 6 |
| 21 day dry - 1 day FTF wet block | 9 | 8 |
| 21 day dry - 7 day FTF wet block | 8 | 6 |
| 21 day dry heated block | 9 | 9 |
| 22 day scrub | 731 | 574 |

The claimed invention is:

1. A water-based latex comprising dispersed waterborne amino-functional polymer particles, dispersed waterborne pendant-functional polymer particles, and water, wherein the pendant-functional polymer comprises at least one pendant amine reactive functional moiety and crosslinks with the amino-functional polymer upon film formation.

2. A latex of claim 1 wherein the pendant amine reactive functional moiety is selected from the group consisting of carbonate, epoxide, isocyanate, isopropenyl, carboxylic acid, and allyl groups.

3. A latex of claim 1, wherein the amino-functional polymer is a polymeric (polyamino) enamine comprising the reaction product of a surfactant-stabilized acetoacetoxy-functional polymer and a poly(alkylenimine).

4. A latex of claim 3, wherein the surfactant-stabilized acetoacetoxy-functional polymer comprises about 1 to about 40 weight percent of a monomer of Formula (1):

$$R^1-CH=C(R^2)C(O)-X^1-X^2-X^3-C(O)-CH_2-C(O)-R^3 \quad (1)$$

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N($R^1$)—, in which $R^1$ is a $C_1$–$C_6$ alkyl group; $X^2$ is a $C_1$–$C_{12}$ alkylene group or $C_3$–$C_{12}$ cycloalkylene group;

about 0.1 to about 5 weight percent of a non-self-polymerizing, surface-active vinyl monomer; and about 75 to about 90 weight percent of a non-acid vinyl monomer; and wherein the poly(alkylenimine) is poly(ethylenimine).

5. A latex of claim 4, wherein the monomer of Formula (1) is selected from acetoacetoxyethyl methacrylate, acetoacetoxyethyl acrylate, acetoacetoxy(methyl)ethyl acrylate, acetoacetoxypropyl acrylate, and acetoacetoxybutyl acrylate and the non-self-polymerizing, surface-active vinyl monomer is a polyoxyethylene alkyl phenyl ether of formula (3), (4), or (5):

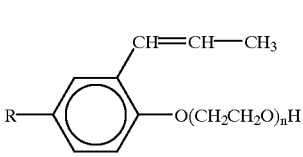
(3)

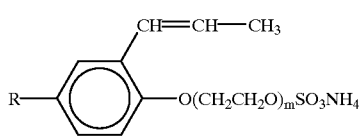

(4)

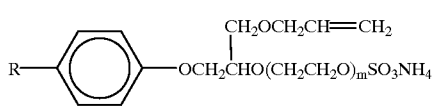

(5)

where R is nonyl or octyl, n ranges from 5 to 50, and m ranges from 15 to 40.

6. A latex of claim 4, comprising from about 5 to about 50 weight percent of the amino-functional polymer particles and about 50 to about 95 weight percent of the pendant-functional polymer particles, based on weight dry resin and wherein the particle size of the amino-functional polymer particles ranges from about 45 to about 500 nm and the particle size of the pendant-functional polymer particles ranges from about 45 to about 500 nm.

7. A latex of claim 6, wherein the particle size of the amino-functional polymer particles ranges from about 25 to about 100 nm.

8. A latex of claim 6, wherein the particle size of the amino-functional polymer particles ranges from about 110 to about 450 nm.

9. A water-based latex comprising dispersed waterborne amino-functional polymer particles, dispersed waterborne pendant-functional polymer particles, a buffer and water; the latex having a pH ranging from about 7.0 to about 9.2 and wherein the pendant-functional polymer comprises at least one pendant amine reactive functional moiety and crosslinks with the amino-functional polymer upon film formation.

10. A latex of claim 9 wherein the pendant amine reactive functional moiety is selected from the group consisting of carbonate, epoxide, isocyanate, isopropenyl, carboxylic acid, and allyl groups.

11. A latex of claim 9, wherein the amino-functional polymer is a polymeric (polyamino) enamine comprising the reaction product of a surfactant-stabilized acetoacetoxy-functional polymer and a poly(alkylenimine) and the buffer is ammonium bicarbonate, ammonium dihydrogenphosphate, or a mixture thereof.

12. A latex of claim 11, wherein the surfactant-stabilized acetoacetoxy-functional polymer comprises about 1 to about 40 weight percent of a monomer of Formula (1):

$$R^1\text{---}CH\text{=}C(R^2)C(O)\text{---}X^1\text{---}X^2\text{---}X^3\text{---}C(O)\text{---}CH_2\text{---}C(O)\text{---}R^3 \quad (1)$$

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N($R^1$)—, in which $R^1$ is a $C_1$–$C_6$ alkyl group; $X^2$ is a $C_1$–$C_{12}$ alkylene group or $C_3$–$C_{12}$ cycloalkylene group;

about 0.1 to about 5 weight percent of a non-self-polymerizing, surface-active vinyl monomer; and about 75 to about 90 weight percent of a non-acid vinyl monomer; and wherein the poly(alkylenimine) is poly(ethylenimine).

13. A latex of claim 12, wherein the monomer of Formula (1) is selected from acetoacetoxyethyl methacrylate, acetoacetoxyethyl acrylate, acetoacetoxy(methyl)ethyl acrylate, acetoacetoxypropyl acrylate, and acetoacetoxybutyl acrylate and the non-self-polymerizing, surface-active vinyl monomer is a polyoxyethylene alkyl phenyl ether of formula (3), (4), or (5):

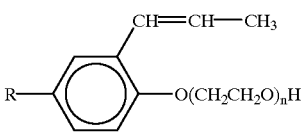

(3)

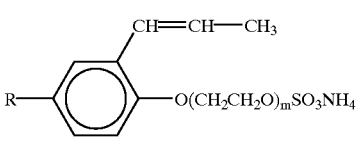

(4)

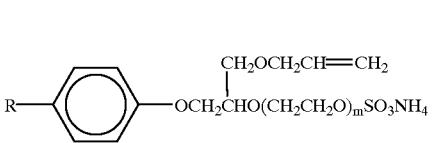

(5)

where R is nonyl or octyl, n ranges from 5 to 50, and m ranges from 15 to 40.

14. A latex of claim 12, comprising from about 5 to about 50 weight percent of the amino-functional polymer particles and about 50 to about 95 weight percent of the pendant-functional polymer particles, based on weight dry resin and wherein the particle size of the amino-functional polymer particles ranges from about 45 to about 100 nm and the particle size of the pendant-functional polymer particles ranges from about 45 to about 500 nm.

15. A latex of claim 12, wherein the particle size of the amino-functional polymer particles ranges from about 25 to about 100 nm.

16. A coating composition comprising a latex of claim 1 and an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a curing agent, a coalescing agent and a waterborne latex different from said latex of claim 1.

17. A coating composition comprising a latex of claim 4 and an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a curing agent, coalescing agent and waterborne latex different from said latex of claim 4.

18. A coating composition comprising a latex of claim 9 and an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a curing agent, a coalescing agent and a waterborne latex different from said latex of claim 9.

19. A method for preparing a water-based latex comprising the step of mixing a water-based latex containing dispersed waterborne amino-functional polymer particles and water with a water-based latex containing dispersed waterborne pendant-functional polymer particles and water wherein the pendant-functional polymer comprises at least one pendant amine reactive functional moiety and crosslinks with the amino-functional polymer upon film formation.

20. A method of claim 19 wherein the pendant amine reactive functional moiety is selected from the group consisting of carbonate, epoxide, isocyanate, isopropenyl, carboxylic acid, and allyl groups.

21. A method for preparing a water-based latex comprising the step of mixing:

an ammonium buffer, a water-based latex containing dispersed waterborne amino-functional polymer particles and water, and a water-based latex containing dispersed waterborne pendant-functional polymer particles and water, wherein the pendant-functional polymer comprises at least one pendant amine reactive functional moiety and crosslinks with the amino-functional polymer upon film formation.

22. A method of claim 21 wherein the pendant amine reactive functional moiety is selected from the group consisting of carbonate, epoxide, isocyanate, isopropenyl, carboxylic acid, and allyl groups.

23. A method of claim 21, wherein the amino-functional polymer is a polymeric (polyamino) enamine comprising the reaction product of a surfactant-stabilized acetoacetoxy-functional polymer and a poly(alkylenimine) and the buffer is ammonium bicarbonate, ammonium dihydrogenphosphate, or a mixture thereof.

24. A method for scavenging residual $\alpha,\beta$-unsaturated, carbonyl- or electron withdrawing group-containing monomers from a polymer latex comprising the step of contacting a polymer latex having residual $\alpha,\beta$-unsaturated, carbonyl- or electron withdrawing group-containing monomers with an effective amount of a latex of claim 3.

* * * * *